US011810305B2

(12) United States Patent
Sarkar et al.

(10) Patent No.: US 11,810,305 B2
(45) Date of Patent: *Nov. 7, 2023

(54) FOREGROUND SEGMENTATION AND NUCLEUS RANKING FOR SCORING DUAL ISH IMAGES

(71) Applicant: Ventana Medical Systems, Inc., Tucson, AZ (US)

(72) Inventors: Anindya Sarkar, Milpitas, CA (US); Jim Martin, Mountain View, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,583

(22) Filed: Jul. 21, 2022

(65) Prior Publication Data
US 2022/0375101 A1 Nov. 24, 2022

Related U.S. Application Data

(63) Continuation of application No. 17/129,065, filed on Dec. 21, 2020, now Pat. No. 11,430,131, which is a
(Continued)

(51) Int. Cl.
*G06T 7/194* (2017.01)
*G06T 7/11* (2017.01)
(Continued)

(52) U.S. Cl.
CPC ............... *G06T 7/194* (2017.01); *G06T 5/20* (2013.01); *G06T 7/0012* (2013.01);
(Continued)

(58) Field of Classification Search
CPC ......... G06T 5/20; G06T 7/194; G06T 7/0012; G06T 7/0014; G06T 7/11; G06T 7/136;
(Continued)

(56) References Cited

U.S. PATENT DOCUMENTS

| 5,650,327 A | 7/1997 | Copeland et al. |
| 5,654,200 A | 8/1997 | Copeland et al. |

(Continued)

FOREIGN PATENT DOCUMENTS

| WO | 2010143100 A1 | 12/2010 |
| WO | 2011049608 A2 | 4/2011 |
| WO | 2013113707 A1 | 8/2013 |

OTHER PUBLICATIONS

Del Bimbo, A., M. Meoni, and P. Pala. "Accurate evaluation of HER-2 amplification in FISH images." In 2010 IEEE International Conference on Imaging Systems and Techniques, pp. 407-410. IEEE, 2010. (Year: 2010).*

(Continued)

*Primary Examiner* — Carol Wang
(74) *Attorney, Agent, or Firm* — CHARNEY IP LAW LLC; Thomas M. Finetti

(57) ABSTRACT

The present disclosure describes a method of foreground segmentation and nucleus ranking for scoring dual ISH images. The method has been developed to better identify those nuclei, within a selected field of view, that meet the criteria for dual ISH scoring.

18 Claims, 19 Drawing Sheets

Related U.S. Application Data continuation of application No. 16/584,224, filed on Sep. 26, 2019, now Pat. No. 10,909,687, which is a continuation of application No. 15/659,491, filed on Jul. 25, 2017, now Pat. No. 10,475,190, which is a continuation of application No. PCT/EP2016/051906, filed on Jan. 29, 2016.

(60) Provisional application No. 62/110,244, filed on Jan. 30, 2015.

(51) Int. Cl.

| | | |
|---|---|---|
| *G06T 7/136* | (2017.01) | |
| *G06T 7/00* | (2017.01) | |
| *G06V 20/69* | (2022.01) | |
| *G06T 7/90* | (2017.01) | |
| *G06T 5/20* | (2006.01) | |

(52) U.S. Cl.
CPC ............. *G06T 7/0014* (2013.01); *G06T 7/11* (2017.01); *G06T 7/136* (2017.01); *G06T 7/90* (2017.01); *G06V 20/69* (2022.01); *G06V 20/695* (2022.01); *G06T 2200/24* (2013.01); *G06T 2207/10024* (2013.01); *G06T 2207/10056* (2013.01); *G06T 2207/20012* (2013.01); *G06T 2207/20021* (2013.01); *G06T 2207/30024* (2013.01); *G06T 2207/30242* (2013.01)

(58) Field of Classification Search
CPC ................. G06T 7/90; G06T 2200/24; G06T 2207/10024; G06T 2207/10056; G06T 2207/20012; G06T 2207/20021; G06T 2207/30024; G06T 2207/30242; G06V 20/69; G06V 20/695
See application file for complete search history.

(56) References Cited

U.S. PATENT DOCUMENTS

| | | | |
|---|---|---|---|
| 6,296,809 | B1 | 10/2001 | Richards et al. |
| 6,352,861 | B1 | 3/2002 | Copeland et al. |
| 6,827,901 | B2 | 12/2004 | Copeland et al. |
| 6,943,029 | B2 | 9/2005 | Copeland et al. |
| 10,475,190 | B2 | 11/2019 | Sarkar et al. |
| 10,909,687 | B2 | 2/2021 | Sarkar et al. |
| 2003/0211630 | A1 | 11/2003 | Richards et al. |
| 2004/0052685 | A1 | 3/2004 | Richards et al. |
| 2007/0124085 | A1* | 5/2007 | Kalusche ............... G06V 20/69 702/20 |
| 2008/0299555 | A1 | 12/2008 | Nitta et al. |
| 2011/0136130 | A1 | 6/2011 | Gniewek et al. |
| 2013/0094733 | A1 | 4/2013 | Nosato et al. |
| 2013/0208970 | A1 | 8/2013 | Fujisawa |
| 2014/0178169 | A1 | 6/2014 | Hebert et al. |
| 2014/0205173 | A1* | 7/2014 | Padfield ................ G06V 20/69 382/133 |
| 2021/0110548 | A1 | 4/2021 | Sarkar et al. |

OTHER PUBLICATIONS

International Search Report and Written Opinion, dated May 12, 2016.

Anonymous: "HER2 Fish pharmDx(TM) Interpretation Guide Breast Cancer", May 12, 2012 (May 12, 2012), pp. 1-6, XP055267275, Retrieved from the Internet <URL:http://web.archive.org/web/20120512200736/http://www.dako.com/00198_21apr10_her2_fish_pharmdx_interpretation_guide_breast_cancer-10477.pdf>.

Gavrielides M A et al: "Automated Evaluation of Her-2/neu Status in Breast Tissue From Fluorescent In Situ Hybridization Images", IEEE Transactions on Image Processing, IEEE Service Center, Piscataway, NJ, US, vol. 14, No. 9, Sep. 1, 2005 (Sep. 1, 2005), pp. 1288-1299, XP011137566, ISSN: 1057-7149, DOI: 10.1109/TIP.2005.852806.

Hanan Samet; Markku Tamminen: "An improved approach to connected component labeling of images", Proceedings of the IEEE Conference On Computer Vision and Pattern Recognition, 1986, pp. 312-318.

Hans Netten et al: "Fluorescent dot counting in interphase cell nuclei", Bioimaging, vol. 4, No. 2, Jan. 1, 1996 (Jan. 1, 1996), pp. 93-106, XP055064887.

Parvin, Bahram et al.: "Iterative voting for inference of structural saliency and characterization of subcellular events.", Image Processing, IEEE Transactions on 16.3, 2007, pp. 615-623.

Sundaresh Ram et al: "Segmentation and detection of fluorescent 3D spots", Cytometry Part A, vol. 81A, No. 3, Feb. 21, 2012 (Feb. 21, 2012), pp. 198-212, XP055161758, ISSN: 1552-4922, DOI: 10.1002/cyto.a.22017.

William J Cukierski et al: "Ranked retrieval of segmented nuclei for objective assessment of cancer gene repositioning", BMC Bioinformatics, Biomed Central, London, GB, vol. 13, No. 1, Sep. 12, 2012 (Sep. 12, 2012), pp. 232, XP021106606, ISSN: 1471-2105, DOI: 10.1186/1471-2105-13-232.

Yang, Q.; Parvin, B.: "Perceptual organization of radial symmetries", Proc. of IEEE Int. Conf. on Computer Vision and Pattern Recognition (CVPR, vol. 1, 2004, pp. 320-325.

Young I T et al: "Acuity: image analysis for the personal computer", Pattern Recognition and Artificial Intelligence. Towards an Integration. International Workshop May 18-20, 1988 Amsterdam, Netherlands,, May 20, 1988 (May 20, 1988), pp. 5-16, XP009189695.

* cited by examiner

| Percent of pathol selected cells that are "found" by FG algorithm | | | | | | | | |
|---|---|---|---|---|---|---|---|---|
| | STD score | 99/3 score | 109/4 score | 99/4 score | 89/4 score | 79/4 score | 99/3 by eye | score |
| pma60_XT_387_1_10_201 | 24 | 86 | 86 | 81 | 86 | 81 | 18 | 90% |
| pma60_XT_387_1_13_201 | 5 | 35 | 30 | 25 | 20 | 25 | 10 | 50% |
| pma60_XT_387_1_14_201 | 50 | 50 | 50 | 50 | 45 | 45 | 13 | 65% |
| pma60_XT_387_1_15_201 | 70 | 85 | 90 | 90 | 90 | 90 | 18 | 90% |
| pma60_XT_387_1_16_201 | 80 | 85 | 80 | 80 | 75 | 80 | 17 | 85% |
| pma60_XT_387_1_18_201 | 75 | 80 | 85 | 75 | 75 | 75 | 17 | 85% |
| pma60_XT_387_1_2_2011 | 40 | 70 | 60 | 60 | 55 | 35 | 15 | 75% |
| pma60_XT_387_1_6_2011 | 80 | 100 | 95 | 100 | 90 | 80 | 20 | 100% |
| pma60_XT_387_1_8_2011 | 35 | 60 | 55 | 60 | 60 | 55 | 19 | 95% |
| pma60_XT_387_1_9_2011 | 80 | 85 | 90 | 90 | 85 | 70 | 19 | 95% |
| pma60_ultra_387_3_11_2 | 70 | 75 | 75 | 85 | 90 | 85 | 17 | 85% |
| pma60_ultra_387_3_12_2 | 55 | 45 | 45 | 50 | 45 | 45 | 14 | 70% |
| pma60_ultra_387_3_14_2 | 40 | 55 | 40 | 45 | 50 | 35 | 16 | 80% |
| pma60_ultra_387_3_15_2 | 50 | 70 | 75 | 80 | 90 | 90 | 12 | 60% |
| pma60_ultra_387_3_16_2 | 70 | 75 | 80 | 80 | 80 | 75 | 16 | 80% |
| pma60_ultra_387_3_18_2 | 25 | 35 | 50 | 50 | 50 | 45 | 15 | 75% |
| pma60_ultra_387_3_2_20 | 75 | 85 | 85 | 80 | 80 | 75 | 16 | 80% |
| pma60_ultra_387_3_6_20 | 35 | 90 | 90 | 80 | 75 | 65 | 20 | 100% |
| pma60_ultra_387_3_8_20 | 55 | 45 | 45 | 30 | 20 | 10 | 11 | 55% |
| pma60_ultra_387_3_9_20 | 70 | 90 | 85 | 85 | 85 | 70 | 18 | 90% |
| | 54 | 70 | 70 | 69 | 67 | 62 | | 80% |

FIG. 9

FOREGROUND SEGMENTATION AND NUCLEUS RANKING FOR SCORING DUAL ISH IMAGES

CROSS-REFERENCE TO RELATED APPLICATIONS

This patent application is a continuation of U.S. patent application Ser. No. 17/129,065, filed on Dec. 21, 2020, which application is a continuation of U.S. patent application Ser. No. 16/584,224 filed on Sep. 26, 2019, which application is a divisional of U.S. patent application Ser. No. 15/659,491 filed on Jul. 25, 2017, which application is a continuation of International Patent Application No. PCT/EP2016/051906 filed Jan. 29, 2016, which applications claims priority to and the benefit of U.S. Provisional Application No. 62/110,244, filed Jan. 30, 2015. Each of the above patent applications are hereby incorporated by reference herein in their entireties.

BACKGROUND OF THE DISCLOSURE

Molecular pathology is the examination at a molecular level of the DNA, mRNA, and proteins that cause or are otherwise associated with disease. Gene amplification and/or overexpression have been identified as an indicator of patient prognosis in a variety of tumors or for determining those patients that should be provided certain treatments. For example, a certain type of breast cancer is associated with an over-abundance (e.g., over expression) of the human epidermal growth factor 2 ("HER2") versus the number of chromosome 17s found in the cell. Sadly, this alteration is also an independent prognostic factor predictive of poor clinical outcome and a high risk of recurrence. By detecting the number of HER2 genes versus the number of chromosome 17s in a tissue sample, this particular type of breast cancer can be more readily identified, and treatment options can be evaluated.

In-situ hybridization can be used to look for the presence of a genetic abnormality or condition such as amplification of cancer-causing genes specifically in cells that, when viewed under a microscope, morphologically appear to be malignant. In situ hybridization (ISH) employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample. For example, INFORM HER2 Dual ISH DNA Probe Cocktail Assay from Ventana Medical Systems, Inc., is intended to determine HER2 gene status by enumeration of the ratio of the HER2 gene to Chromosome 17. The HER2 and Chromosome 17 probes are detected using a two color chromogenic ISH in formalin-fixed, paraffin-embedded human breast cancer tissue specimens.

Digital microscopy systems have been introduced wherein tissue samples are prepared in the usual way of being mounted on glass slides, but instead of having the pathologist view the samples using a manually controlled optical microscope, the slides are processed using digital imaging equipment. In recent years, digital pathology has transformed from the use of camera-equipped microscopes to high-throughput digital scanning of whole tissue samples. This development not only enables virtual storing and sharing of biological data, but it also improves the turn-around times for the pathologist and the patient.

The digitization of biological data has enabled the use of computers assisting in the diagnosis. The dramatic increase of computer power over the past decades, together with the development of advanced image analysis algorithms, has allowed the development of computer-assisted approaches capable of analyzing the bio-medical data. Interpreting tissue slides manually is labor intensive, costly and involves the risk of human errors and inconsistency, while using automated image analysis can provide additional automatic, fast and reproducible analyses, assisting the pathologist in making an accurate and timely diagnosis.

The importance of nucleus-vs-background segmentation is explained in the context of the primary aim of digital pathology—to analyze and score the stained tissue slides. In some examples, when the cell nucleus is stained indicating positive/negative tumor staining, then the nuclei need to be detected and then classified into the right category—e.g. positive tumor nuclei, negative tumor nuclei, nuclei of stromal cells, of lymphocytes, and so on. For the correct classification, it is often required that certain features corresponding to nucleus shape, size, need to be computed and hence, accurate nucleus-vs-background segmentation, in the following referred to as nucleus segmentation, is required. In the context of Dual ISH images, nuclei which are particularly suited for scoring by a downstream image analysis system or a pathologist need to be identified. Thus, for Dual ISH images, the requirement from a nucleus segmentation method is that only those nuclei should be picked, where the dots can be clearly detected and where the dot colors can be clearly identified. Also, if the nucleus is not isolated, then incorrect segmentation can result in a nucleus boundary extending to a nearby nucleus, resulting in nearby dots also being counted giving an erroneous count. The opposite scenario of a proper nucleus boundary being only partially identified may also lead to genuine dots being missed. Ultimately, incorrect segmentation can produce an incorrect black-to-red score.

In general, the process of segmentation aims to separate the cell nuclei from the background (e.g. cytoplasm) in any histological image or series of images. Segmentation of cell nuclei is believed to be a challenging problem due to wide size and shape variations of the nuclei, complex heterogeneity within nucleus and in stroma, improper staining, imaging artifacts, variation in density of the nuclei in an image and across different images, and occluded nuclei.

There remains a need for an improved method of nucleus detection and segmentation that provides a high level of quality and accuracy.

BRIEF SUMMARY OF THE DISCLOSURE

In one aspect of the present disclosure is a computer-implemented method of segmenting and ranking nuclei in images derived from a tissue specimen comprising (1) computing a foreground segmentation mask based on an image input; (2) identifying individual nuclei by filtering the input image with the computed foreground segmentation mask; (3) computing metrics for all identified nuclei based on black and red in situ hybridization signals present in the nuclei; (4) evaluating the metrics to determine nuclei suitable for ranking, wherein nuclei suitable for ranking (i) have at least one black dot corresponding to black in situ hybridization signals, (ii) have at least one red dot corresponding to red in situ hybridization signals, and (iii) satisfy a predetermined area constraint; and (5) identifying a top N number of nuclei for scoring from the determined nuclei suitable for ranking.

In some embodiments, the foreground segmentation mask is computed by (1) applying filters to enhance the image such that (a) image regions unlikely to have nuclei are discarded, and (b) nuclei within a local region are identified; and (2) further applying optional filters to selectively remove artifacts, remove small blobs, remove discontinuities, fill holes, and split up bigger blobs. In some embodiments, the filters applied are selected from the group consisting of a global thresholding filter, a locally adaptive thresholding filter, morphological operation filters, and watershed transformation filters. In some embodiments, the global thresholding filter is applied first, followed by application of the locally adaptive thresholding filter. In some embodiments, the optional filters to selectively remove artifacts, remove small blobs, remove discontinuities, fill holes, and split up bigger blobs are applied after application of the locally adaptive thresholding filter. In some embodiments, the identification of the individual nuclei further comprises performing a connected components labeling process on the filtered input image.

In some embodiments, the metrics based on the black and red in situ hybridization signals present in the identified nuclei are selected from the group consisting of an average absorbance metric and an average A channel metric. In some embodiments, the average absorbance metric is computed within the RGB domain at all local maxima using radial symmetry voting on gradient magnitude of difference of Gaussian applied on the absorbance channel. In some embodiments, the average A channel metric is computed within the LAB color space at all local maxima using radial symmetry voting on gradient magnitude of difference of Gaussian applied on the A channel.

In some embodiments, the top N number of nuclei for scoring are identified by (1) identifying a total number of nuclei that meet the established criteria; (2) segregating the identified total number of nuclei into three subsets, where a first subset comprises nuclei ranked as having the highest average absorbance, a second subset comprises nuclei ranked as having the highest average A, and a third subset comprises nuclei common to both the first and second subsets; and (3) evaluating whether a number of nuclei in the third subset meets a predefined threshold amount, i.e. a predetermined number of nuclei. In some embodiments, the number of nuclei within the third subset are ranked based on a black-to-red ratio. In some embodiments, the method further comprises the step of scoring the identified nuclei.

In another aspect of the present disclosure is a computing device configured to segment and rank nuclei in source images comprising one or more processors and at least one memory, the at least one memory storing non-transitory computer-readable instructions for execution by the one or more processors to cause the one or more processors to execute instructions to: (1) compute a foreground segmentation mask based on an image input; (2) identify individual nuclei by filtering the input image with the computed foreground segmentation mask to; (3) compute metrics for all identified nuclei based on black and red in situ hybridization signals present in the nuclei; (4) the metrics to determine nuclei suitable for ranking, wherein nuclei suitable for ranking have at least one black dot corresponding to black in situ hybridization signals, at least one red dot corresponding to red in situ hybridization signals, and satisfy a predetermined area constraint; and (5) identify a top N number of nuclei for scoring, where N is, for example, an integer ranging from about 15 to about 25. In some embodiments, the foreground segmentation mask is computed by (1) applying filters to enhance the image such that (a) image regions unlikely to have nuclei are discarded, and (b) nuclei within a local region are identified; and (2) further applying optional filters to selectively remove artifacts, remove small blobs, remove small discontinuities, fill holes, and split up bigger blobs. In some embodiments, the filters applied are selected from the group consisting of a global thresholding filter, a locally adaptive thresholding filter, morphological operation filters, and watershed transformation filters. In some embodiments, the global thresholding filter is applied first, followed by application of the locally adaptive thresholding filter. In some embodiments, the optional filters to selectively remove artifacts, remove small blobs, remove small discontinuities, fill holes, and split up bigger blobs are applied after application of the locally adaptive thresholding filter.

In some embodiments, the identification of individual nuclei comprises performing a connected components labeling process on the filtered input image. In some embodiments, the metrics based on black and red in situ hybridization signals present in the identified nuclei are selected from the group consisting of an average absorbance metric and an average A channel metric. In some embodiments, the average absorbance metric is computed within the RGB domain at all local maxima using radial symmetry voting on gradient magnitude of difference of Gaussian applied on the absorbance channel. In some embodiments, the average A channel metric is computed within the LAB color space at all local maxima using radial symmetry voting on gradient magnitude of difference of Gaussian applied on the A channel.

In some embodiments, the top N number of nuclei for scoring are identified by (1) identifying a total number of nuclei that meet the established criteria; (2) segregating the identified total number of nuclei into three subsets, where a first subset comprises nuclei ranked as having the highest average absorbance, a second subset comprises nuclei ranked as having the highest average A, and a third subset comprises nuclei common to both the first and second subsets; and (3) evaluating whether a number of nuclei in the third subset meets a predefined threshold amount. In some embodiments, the number of nuclei within the third subset are ranked based on a black to red ratio. In some embodiments, the instructions are further provided to score the identified nuclei.

In another aspect of the present disclosure is a cell analyzer comprising a computer configured to segment and rank nuclei in source images comprising one or more processors and at least one memory, the at least one memory storing non-transitory computer-readable instructions for execution by the one or more processors to cause the one or more processors to execute instructions to: (1) compute a foreground segmentation mask based on an image input; (2) identify individual nuclei by filtering the input image with the computed foreground segmentation mask to; (3) compute metrics for all identified nuclei based on black and red in situ hybridization signals present in the nuclei; (4) the metrics to determine nuclei suitable for ranking, wherein nuclei suitable for ranking have at least one black dot corresponding to black in situ hybridization signals, at least one red dot corresponding to red in situ hybridization signals, and satisfy a predetermined area constraint; and (5) identify a top N number of nuclei for scoring, where N is an integer ranging from about 15 to about 25; and an imaging apparatus.

In another aspect of the present disclosure is a method for automated segmenting and ranking of nuclei in a tissue specimen, comprising: (a) applying a first in situ hybridization probe and a second in situ hybridization probe to the tissue specimen; (b) subsequently obtaining a digital image of the tissue specimen; (c) selecting a field of view in the digital image; (d) within the selected field of view, computing a foreground segmentation mask to identify individual nuclei; (e) computing metrics for all identified nuclei based on average absorbance and average A channel derived from signals from the first and second in situ hybridization probes; (f) evaluating the metrics to determine nuclei suitable for ranking; and (g) providing as output a top N number of nuclei for scoring.

In another aspect of the present disclosure is a computing device configured to segment and rank cell nuclei in source images derived from a tissue sample comprising one or more processors and at least one memory, the at least one memory storing non-transitory computer-readable instructions for execution by the one or more processors to cause the one or more processors to execute instructions to (1) compute a foreground segmentation mask based on the source images; (2) identify all nuclei in the foreground segmentation mask and retain those nuclei which satisfy certain pre-defined constraints; (3) compute metrics for all nuclei based on in situ hybridization signals present in the nuclei; (4) evaluate the metrics to determine nuclei suitable for ranking; and (4) after ranking, output a top N number of nuclei for scoring. In some embodiments, the foreground segmentation mask is computed by (1) applying filters to enhance the image such that (a) image regions unlikely to have nuclei are discarded, and (b) nuclei within a local region are identified; and (2) further applying optional filters to selectively remove artifacts, remove small blobs, remove small discontinuities, fill holes, and split up bigger blobs. In some embodiments, the foreground segmentation mask is computed by binarizing the image by applying global thresholding operation and a locally adaptive thresholding operation. In some embodiments, instructions are provided to apply a connected components labeling process to identify the individual nuclei in the computed foreground segmentation mask. In some embodiments, the metrics are computed from an average absorbance of in situ hybridization signals and an average A channel of in situ hybridization signals in all identified nuclei. In some embodiments, and in the context of Dual ISH images, it is observed that for black dot pixel locations, absorbance is generally higher than that for non-dot pixels or red dot pixels. In some embodiments, and again in the context of Dual ISH images, it is observed that for red dot pixel locations, the A value is generally higher than that for non-dot pixels or black dot pixels.

In a further aspect, the disclosure relates to an image analysis method of segmenting and ranking nuclei in a digital image of a tissue specimen. The tissue specimen is stained with at least a first and a second in situ hybridization stain. The first stain and the second stain have different colors. The method is implemented in an image analysis system and comprises:

segmenting the digital image for generating a foreground segmentation mask, the foreground segmentation mask being selectively indicative of image regions representing nuclei;

identifying individual nuclei in foreground regions identified by the foreground segmentation mask whose size exceeds a nucleus size threshold value;

for each of the identified nuclei, performing an initial dot detection routine in a first channel image derived from the digital image for identifying first dots in said nucleus and in a second channel image derived from the digital image for identifying second dots in said nucleus, each first dot being a blob whose pixel values in the first channel image correlate with the amount of first stain, each second dot being a blob whose pixel intensities in the second channel image correlate with the amount of second stain; and for each of the identified nuclei, counting the number of first dots and the number of second dots in said nucleus.

In some embodiments, the average absorbance is computed at all local maxima using radial symmetry on gradient magnitude of difference of Gaussian applied on the absorbance image (absorbance image is computed from the RGB optical density domain). In some embodiments, the average A channel is computed at all local maxima using radial symmetry on gradient magnitude of difference of Gaussian applied on the A channel (where the A channel is obtained after the RGB image is converted to the LAB color space). In some embodiments, the metrics are values corresponding to a number of red dots and a number of black dots in each individual nucleus, the black dots derived from average absorbance values computed in a RGB optical domain and the red dots derived from average A channel values computed in the LAB color space. In some embodiments, instructions are provided to filter those nuclei not meeting a minimum threshold area constraint. In some embodiments, ranking is performed only for those nuclei having a first in situ hybridization signal and a second in situ hybridization signal and that further meet the minimum threshold area constraint. In some embodiments, the nuclei are further ranked according to a combination of metrics based on average absorbance and average A channel values to output a final ranked list of nuclei for further processing.

In some embodiments, the metrics are values corresponding to a first in situ hybridization signal (e.g. black or red) and to a second in situ hybridization signal (e.g. the other of black or red) in each individual nucleus, the first in situ hybridization signal derived from a first image parameter (for example, but not limited to, average absorbance values computed in a RGB optical domain) and the second in situ hybridization signal derived from a second image parameter (for example, but not limited to, average A channel values computed in the LAB color space). In some embodiments, the tissue specimen comprises a breast cancer specimen and wherein the in situ hybridization signals are "black signals" which correspond to black dots and red signals which correspond to red dots.

Applicants have proposed a superior method of foreground segmentation and nucleus ranking for dual ISH images as compared with prior art methods. Indeed, the presently disclosed method consistently allows for the selection of good "scoreable" nuclei and the selection of more amplified nuclei, two qualities that allow for high-quality scoring of dual ISH images. For example, dual ISH scoring guidelines state that the pathologist should pick those nuclei which are more amplified, and where the tasks of dot detection and dot color classification are visually obvious. In view of this, the new method is designed to return nuclei where the dots are easy to detect, and where the "blackness" of black dots (based on absorbance) and the "redness" of red dots (based on A channel), and the relative amplified nature of the nucleus (relative number of black dots to red dots) are all considered. Indeed, Applicants have confirmed that the presently disclosed method is superior (through comparison with ground truth data) and allows for a much higher fraction of pathologist verified and marked nuclei to be retained as compared with the prior art methods.

In contrast, prior art methods have focused on picking nuclei with good shape and/or nuclei which were easy to segment out. Indeed, it was assumed that by looking to nuclear shape (circular or elliptical blobs with high gradient along their boundary), that good nuclei candidates were being selected. In fact, picking nuclei with good shape often allowed for nuclei to be missed if they were not of the "proper" circular or elliptical shape (shape is often an artifact of the segmentation process). These methods, however, were not aligned with the methods and criteria used by pathologists. Moreover, the ease of dot detection and dot color classification were not considered, nor were the relative number of black dots to red dots inside the nuclei. With regard to Dual ISH, and as detailed herein, the presently disclosed system and method allows for nuclei to be returned where any dots contained therein are easier to detect and where the "blackness" of black dots (based on absorbance) and the "redness" of red dots (based on A channel), and the relative amplified nature of the nucleus (relative number of black dots to red dots) are all factors that are taken into consideration. Moreover, the system and methods disclosed herein place emphasis on the selection of good scoreable nuclei and the selection of nuclei comprising in-situ-hybridization signals being indicative of amplified genes. Applicants submit that the presently disclosed system and method provides a workflow which is more attune with a pathologist's definition of a "good" scoreable nucleus, where it is easy to detect and classify any dots present. The method described herein overcomes these issues and others.

BRIEF DESCRIPTION OF THE DRAWING FIGURES

The patent or application file contains at least one drawing executed in color. Copies of this patent or patent application publication with color drawings will be provided to the Office upon request and the payment of the necessary fee.

FIG. 9 shows the percentage of pathologist selected nuclei that were "found" by the foreground segmentation method described herein;

Figure 10:
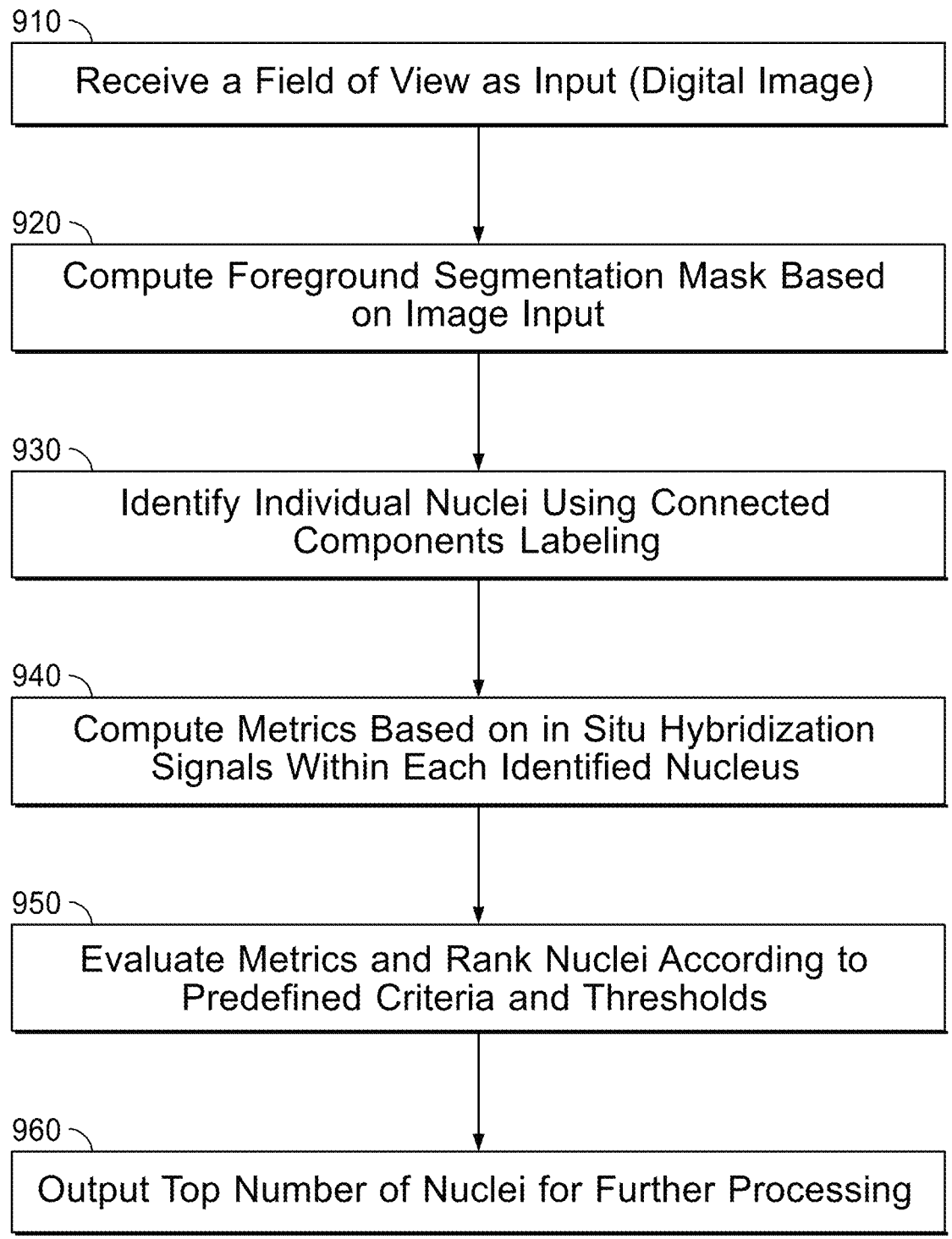
Figure 11:
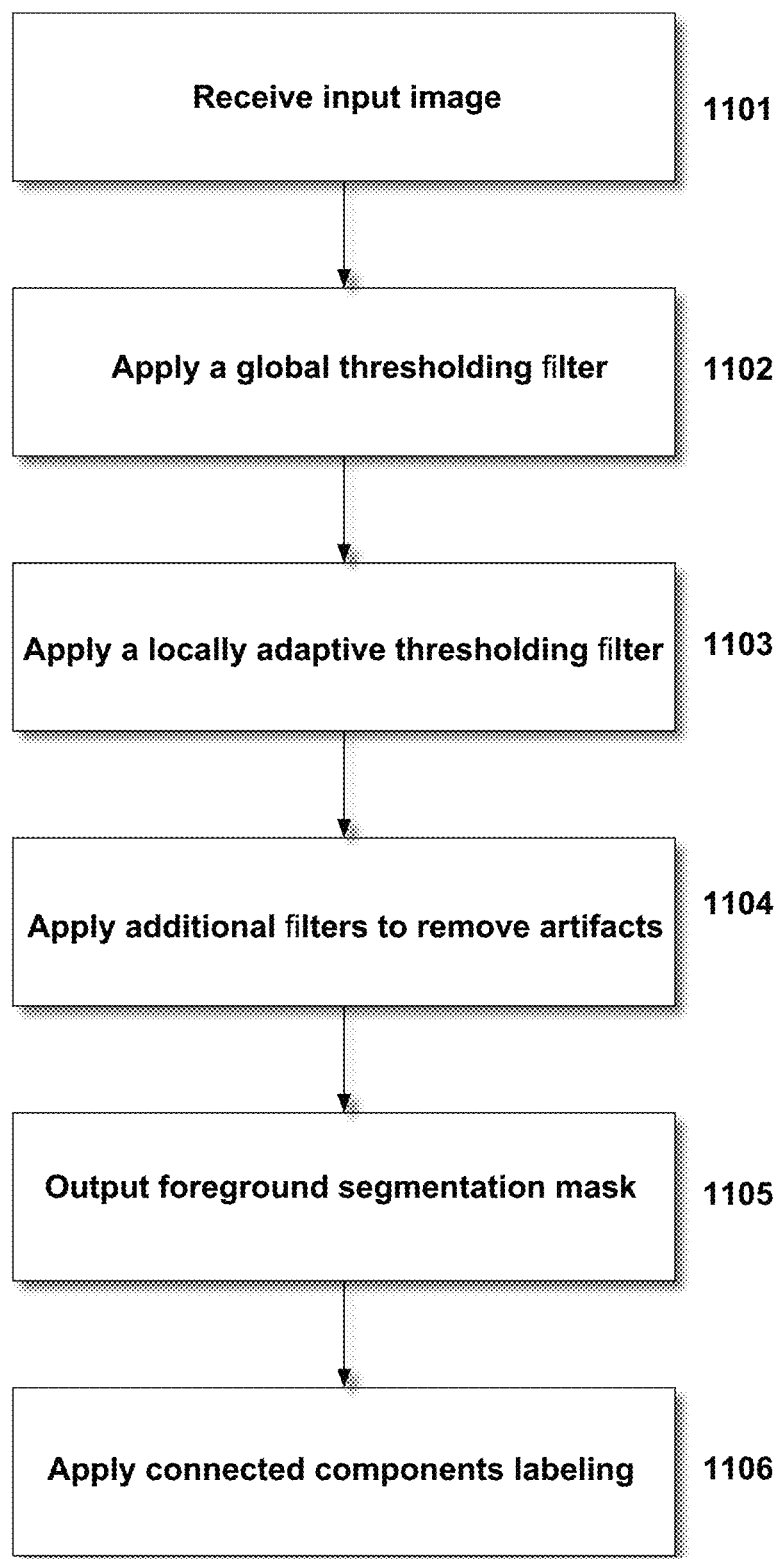
Figure 12:
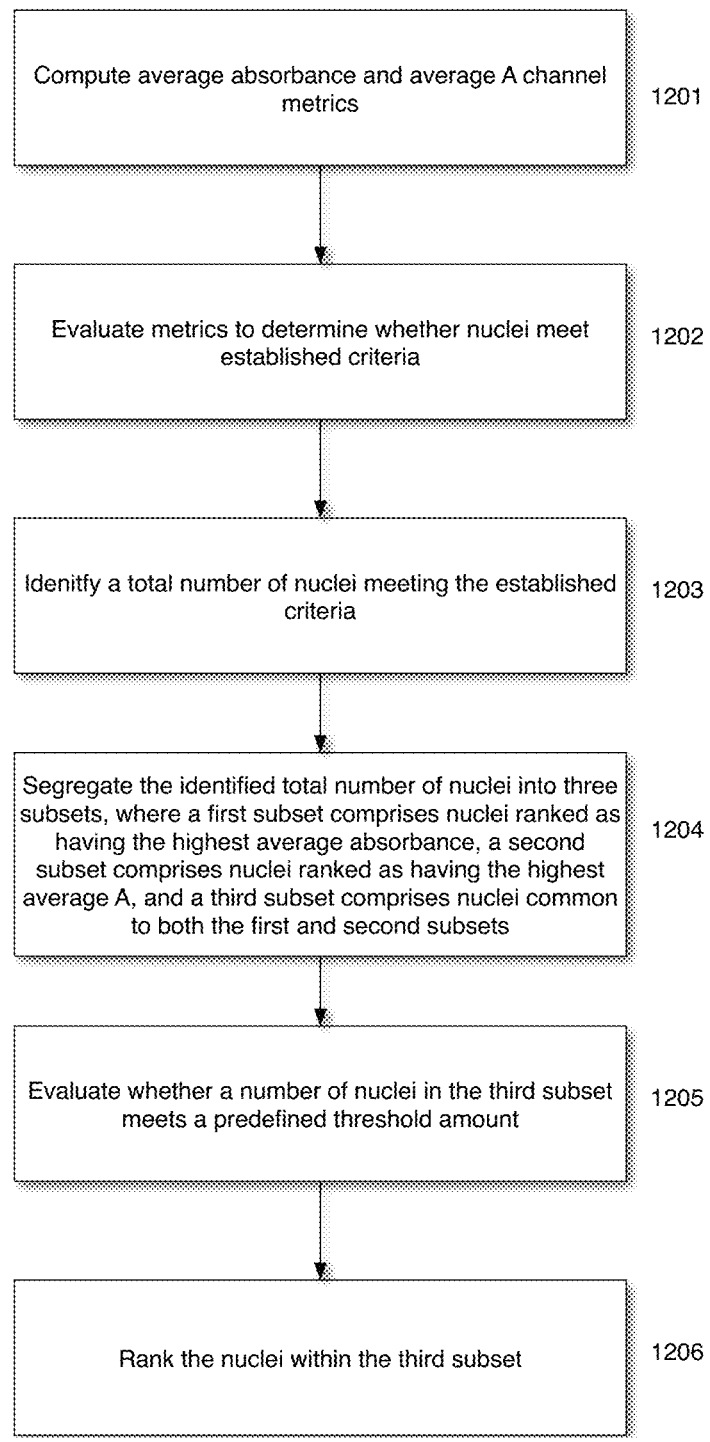

FIG. 10 provides a flowchart summarizing the general steps involved in foreground segmentation mask computation and nucleus ranking according to certain embodiments of the present disclosure;

FIG. 11 provides a flowchart illustrating the steps within the foreground segmentation mask module; and FIG. 12 provides a flowchart illustrating the steps within the metric computation module.

DETAILED DESCRIPTION

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

A "tissue sample" as used herein is any biological sample that is obtained from a human or animal body for anatomic pathology. For example, a tissue sample may be derived from breast tissue, lung tissue, prostate tissue, etc. and may comprise samples derived from tumors, suspected tumors, or from healthy tissue. Other examples of tissue samples and specimens are their preparation are disclosed herein. The tissue sample may be treated in an assay with one or more stains to assist in the identification of structures (e.g. vessels, nuclei, etc.) within the sample.

The present disclosure describes a method of foreground segmentation and nucleus ranking. In some embodiments, the method has been developed to better identify those nuclei, within a selected field of view ("FOV"), that meet the criteria for dual ISH scoring. In general, and as applied in the context of dual ISH for HER2 detection, the goal is to return nuclei where the dots are easier to detect by considering (1) the blackness of black dots (based on absorbance); (2) the redness of red dots (based on A channel), and (3) the relative amplified nature of the nuclei (relative number of black dots to red dots, e.g. a ratio of black signal to red signal). In some embodiments, and according to Dual ISH scoring guidelines, when considering two nuclei for scoring, the nucleus which has a higher black-to-red ratio should be selected.

At least some embodiments of the technology disclosed herein relates to computer systems and methods for analyzing digital images captured from tissue samples pretreated with in situ hybridization probes. The samples may be a breast tissue sample processed according to an in situ hybridization ("ISH") protocol, as known in the art. In other embodiments, the specimen is a gastric tissue sample including, but not limited to stomach tissue, esophageal tissue, gastro-esophageal junction tissue, intestinal tissue, and colon tissue, again processed according to an ISH protocol. While specific examples herein may refer to breast tissue, these and other tissues are contemplated.

The ISH protocol provides visualization of specific nucleic acid sequences (e.g., DNA, mRNA, etc.) in frozen tissue sections, fixed/paraffin embedded tissue sections, or other nuclei preparations by hybridizing complementary strands of nucleotides (e.g., probes) to the sequence of interest. The ISH protocol can include, without limitation, a dual SISH and Red ISH protocol, single Red ISH protocol, single SISH protocol, or the like.

Although exemplary embodiments described herein disclose the application of a dual ISH probe to breast tissue, ultimately for the detection of the expression of the HER2 gene in the cell nuclei contained therein, it will be appreciated that the technology can be used to analyze images of other tissue samples treated with other probes and/or assays to detect other genes or portions thereof in nuclei, as well as other features of interest. For example, while "black dots," "red dots," "black signals," and "red signals" may be referred to herein in certain examples, it is entirely foreseeable that other probes may be used and analyzed which provide for different signals and/or dots of any color and the filters and evaluations provided herein may be so adapted to accommodate those other assays and probes. Indeed, certain embodiments disclose application of dual ISH scans, taken at 40× resolution, where over-expression or under-expression of a gene depends on the identification of stained dots, where black dots and red dots are expressed through HER2 and Chr-17 markers, respectively.

When using the Ventana INFORM HER2 dual ISH assay, to determine a HER2/chromosome 17 ratio, the imaging apparatus 12 captures images that include silver in situ hybridization signals, red in situ hybridization signals, or the like. More specifically, the HER2 gene is detected by a dinitrophenyl (DNP) labeled probe and visualized utilizing VENTANA ultraView Silver ISH DNP (SISH) Detection. The chromosome 17 centromere is targeted with a digoxigenin (DIG) labeled probe and detected using VENTANA ultraView Red ISH DIG Detection. Dual ISH staining utilizing this dual detection results in visualization via light microscopy in which HER2 appears as discrete black signals (SISH) (e.g. black dots) and Chr17 as red signals (Red ISH) (e.g. red dots). In the context of Dual ISH slides, the nucleus based scoring involves counting of red and black dots inside the picked nuclei, where the HER2 gene expression is expressed through black dots and Chromosome-17 is expressed through red dots, as described further herein.

Figure 1:
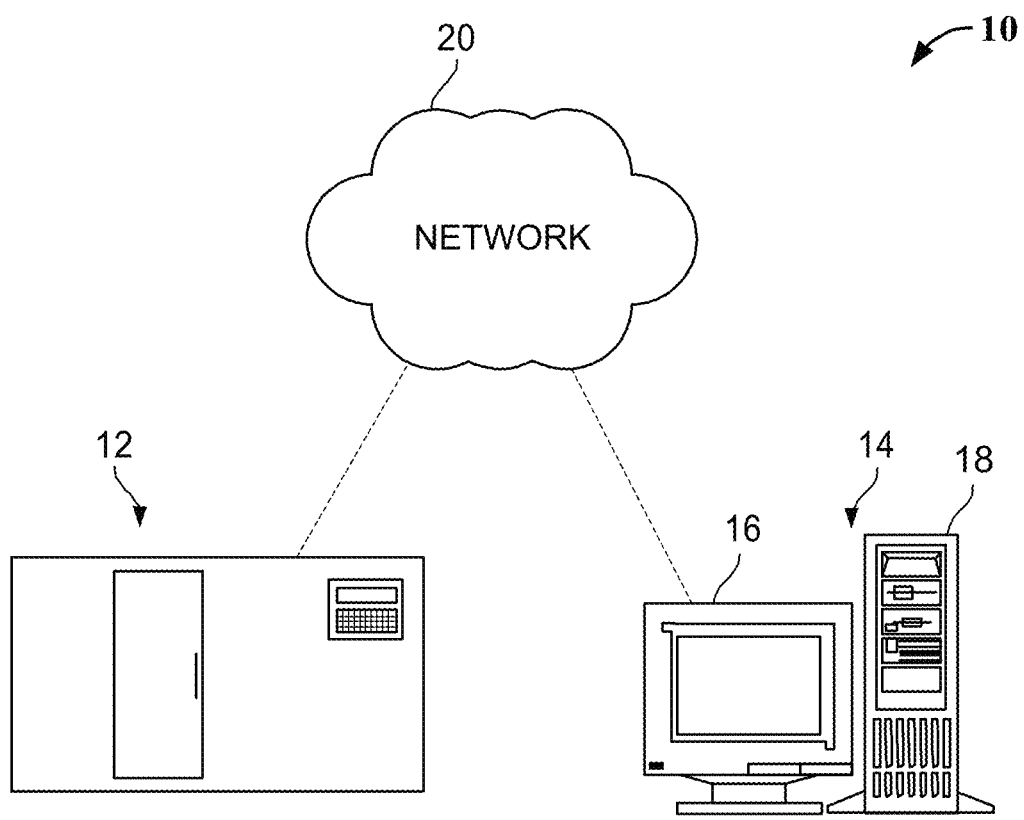
FIG. 1 shows a computer-based system for analyzing specimens in accordance with embodiments of the disclosed technology.

By way of example, a computer-based specimen analyzer for analyzing specimens is shown in FIG. 1. The skilled artisan will appreciate that other computer systems may be utilized and that the computer systems described herein may be communicatively coupled to additional components, e.g. analyzers, scanners, etc. Some of these additional components and the various computers that may be utilized are described further herein.

In general, the imaging apparatus 12 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus 12 produces a high-resolution image of the entire specimen.

The computer device system 14 can include a desktop computer, a laptop computer, a tablet, or the like and can include digital electronic circuitry, firmware, hardware, memory, a computer storage medium, a computer program, a processor (including a programmed processor), or the like. The illustrated computing system 14 of FIG. 1 is a desktop computer with a screen 16 and a tower 18. The tower 18 can store digital images in binary form. The images can also be divided into a matrix of pixels. The pixels can include a digital value of one or more bits, defined by the bit depth. The network 20 or a direct connection interconnects the imaging apparatus 12 and the computer system 14.

In one aspect of the present disclosure is a computer-based device or system and method for foreground segmentation and nuclei ranking for scoring dual ISH images. The device includes one or more processors that are programmed with a series of computer-executable instructions, the instructions being stored in a memory. In general, and with reference to the flowchart in FIG. 10, once a field of view (FOV) is selected by a medical professional (step 910), dual ISH protocol calls for selecting a number of good nuclei for scoring (e.g. 20 nuclei). Foreground segmentation is a necessary first step in accessing and selecting cell nuclei within the image (step 920). Indeed, it is within the cell nuclei (identified after computation of the segmentation mask (step 930)), where the ISH signals are identified and analyzed (and, in the context of dual ISH for HER2 represented as black dots and red dots). Following this, various metrics may be computed based on the in situ hybridization signals within each identified nucleus (step 940). Next, metrics are analyzed to determine whether the nuclei meet certain criteria or thresholds for further processing (step 950). Those nuclei meeting the criteria or thresholds are retained and ranked and the top nuclei candidates are identified for downstream screening (step 960). Each of these steps will be described in more detail herein.

Foreground Segmentation Mask Generation Module

When executed, instructions cause at least one of the processors of the computer system to receive an input, such as an indication of one or more FOVs from a user or other upstream process. The FOVs correspond to one or more color images of a tissue sample pretreated with, for example, two ISH probes. In some embodiments, the computer system then executes instructions that cause one or more processors to generate a foreground segmentation mask (step 920), thus segmenting or identifying the boundaries of the nuclei within a particular FOV.

In some embodiments, foreground segmentation is achieved by applying a series of filters designed to enhance the image such that (i) image regions unlikely to have nuclei are discarded, and (ii) nuclei within any local region are identified. Additional filters may be selectively applied to remove artifacts, remove small blobs, remove small discontinuities, fill holes, and split up bigger blobs (see FIG. 11, steps 1101 through 1104). The result is a foreground segmentation mask (1105) where connected components (1106) may be subsequently applied to provide access to the individual cell nuclei.

Any filters known to those of ordinary skill in the art may be applied to filter the images and provide for a foreground segmentation mask meeting the criteria of the present disclosure. In some embodiments foreground segmentation is achieved by applying a series of filters, including global thresholding, local adaptive thresholding, morphological operations, and watershed transformations. The filters may be run sequentially or in any order deemed necessary by those of ordinary skill in the art. Of course, any filter may be applied iteratively until the desired outcome is achieved. The progression of the sequential application of the above-identified filters is demonstrated in one embodiment in FIGS. 2A through 8A; and in a second embodiment in FIGS. 2B through 8B, and as summarized herein.

In some embodiments, a first filter is applied to the input image (1101) to remove regions that are unlikely to have nuclei, such as removing those image regions that are white (corresponding to regions in the tissue samples that are unstained or nearly unstained). In some embodiments, this is achieved by applying a global thresholding filter (1102). Thresholding is a method used for converting an intensity image (I) into a binary image (I') by assigning to all pixels the value one or zero if their intensity is above or below some threshold value, here a global threshold value. In other words, global thresholding is applied to partition pixels depending on their intensity value.

Figure 2A:
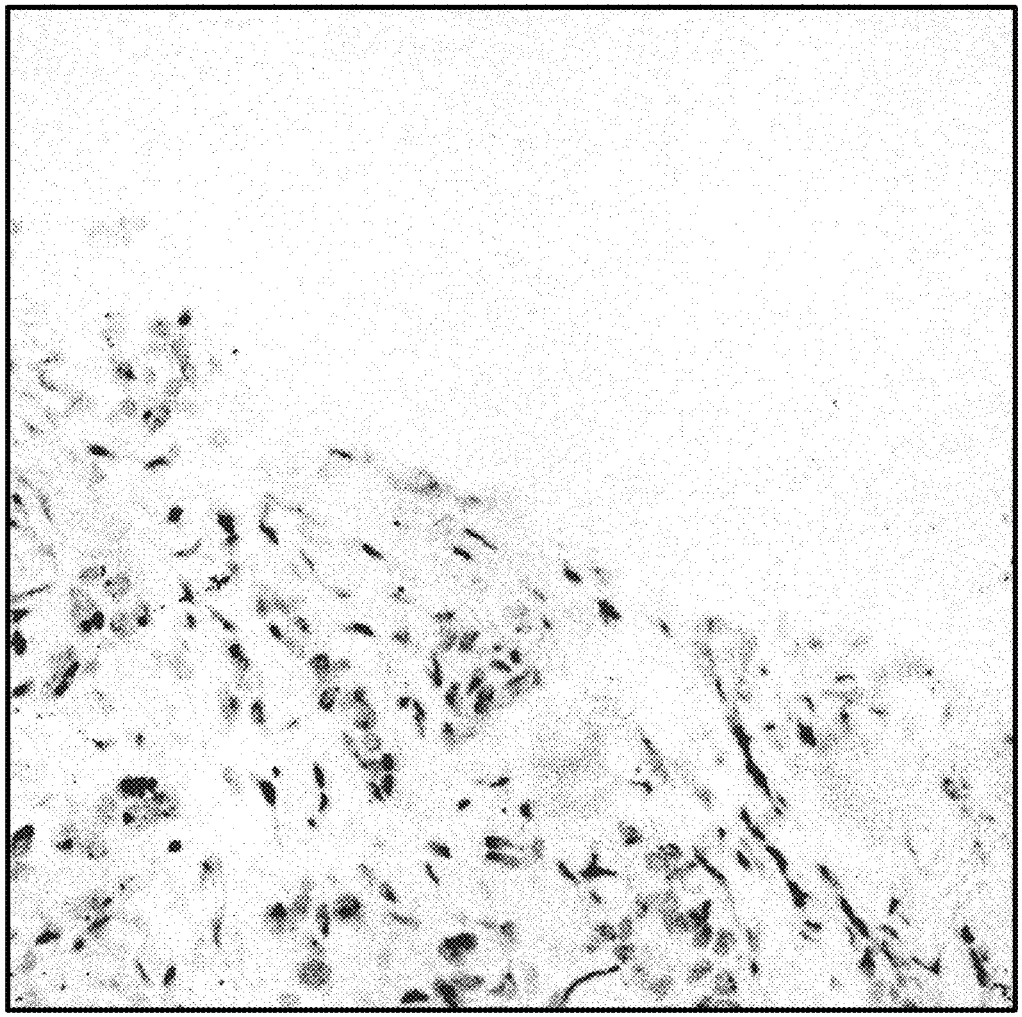
FIGS. 2A and 2B show images used as inputs within a selected field of view (FOV)
Figure 2B:
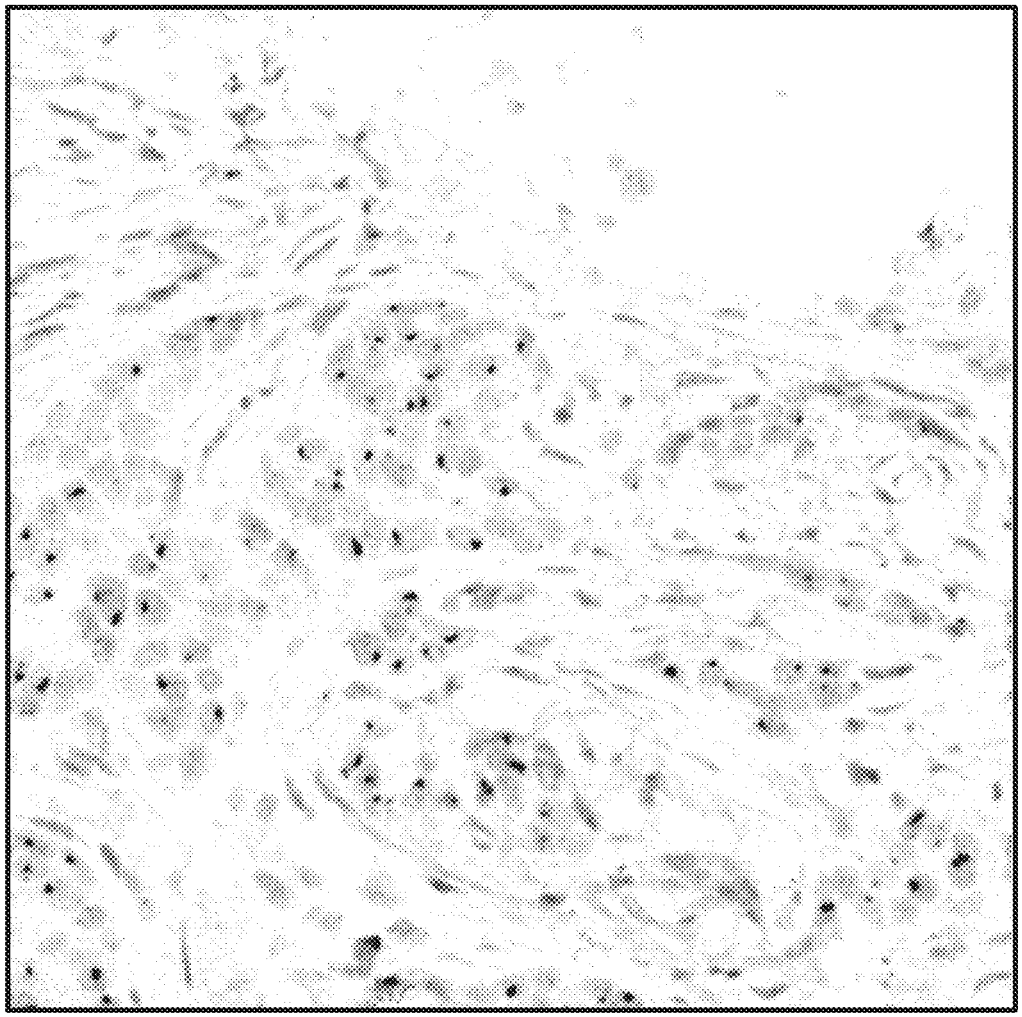
Figure 3A:
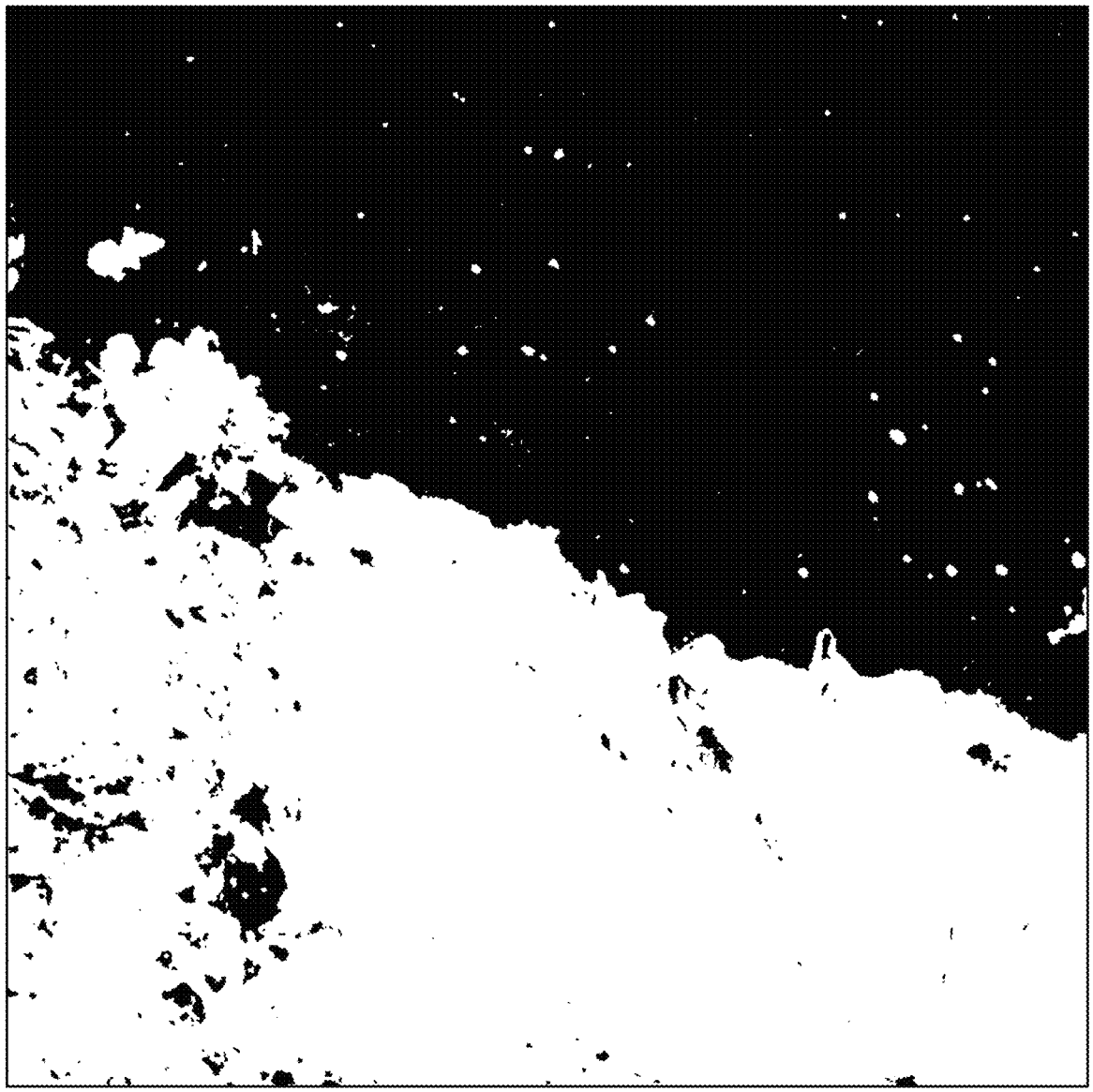
FIGS. 3A and 3B show the resulting binary mask after application of a global thresholding filter to FIGS. 2A and 2B, respectively.
Figure 3B:
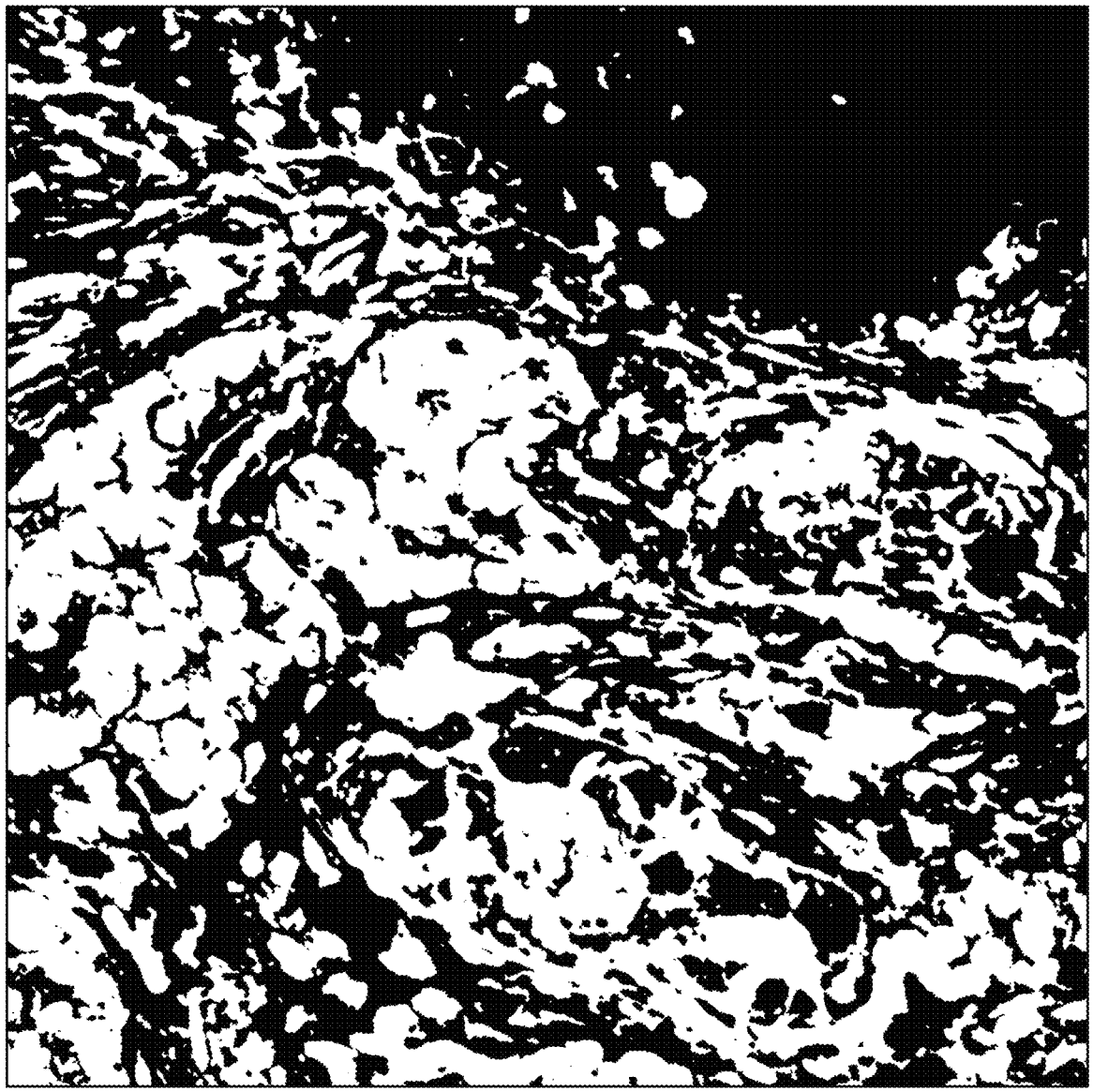

In some embodiments, the global thresholding is based on a median and/or standard deviation computed on a first principal component channel (see Example 1), e.g. similar to a gray scale channel. By obtaining the global threshold, it is believed that any white image regions, which are representative of unstained or nearly unstained regions where nuclei are likely not present, can be discarded. An example of the application of global threshold is found in Example 1 herein. FIGS. 2A and 2B show input images of a particular FOV. FIGS. 3A and 3B show the resulting binary mask after application of the global thresholding filter to the images in FIGS. 2A and 2B, respectively.

Figure 4A:
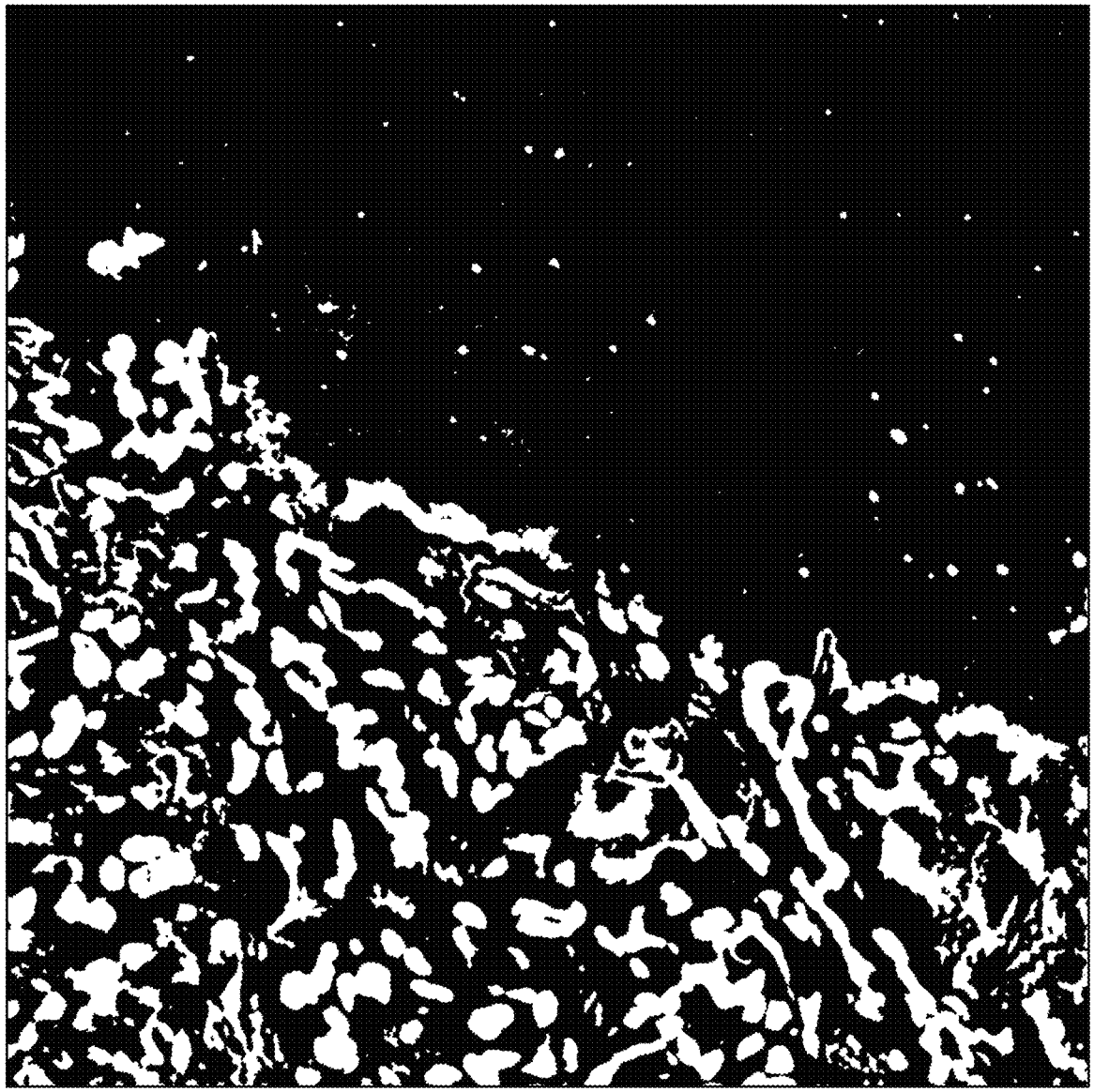
FIGS. 4A and 4B show the resulting binary mask after application of a locally adaptive thresholding (LAT) filter to FIGS. 3A and 3B, respectively.
Figure 4B:
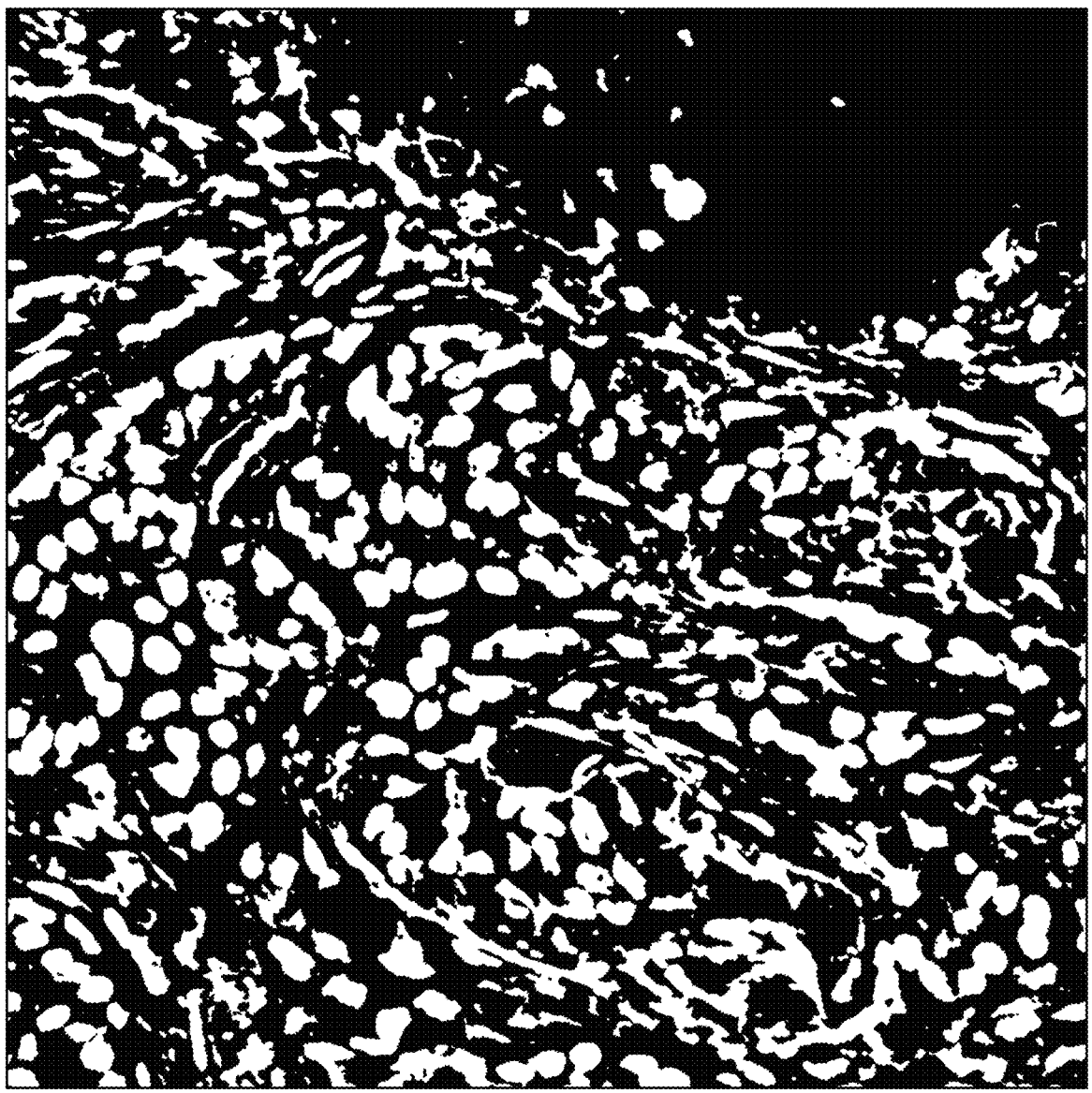

In some embodiments, a filter is applied to identify the nuclei in a local region of the inputted image. In some embodiments, this is achieved by applying locally adaptive thresholding (LAT) (1103). LAT is performed by examining the intensity of an image in the pixel's neighborhood. As applied here, the pixels inside a nucleus are believed to be darker than their immediate neighborhood, hence a LAT method is utilized which captures locally darker pixels and is believed to capture the foreground nuclei better. Both the window size (w) and the scale factor (s) are varied during locally adaptive thresholding to control the smoothing kernel. In some embodiments, the window size (w) and the scale factor (s) are used to control the Gaussian smoothing of the image. In some embodiments, the window size and sigma factor (w,s) were chosen from one of (99,3), (109,4), (99,4), (89,4), or (79,4), although other combinations may be selected by those of ordinary skill in the art. An example of the application of LAT is found in Example 2 herein. FIGS. 4A and 4B show the resulting binary mask after application of the LAT filter to the images in FIGS. 3A and 3B, respectively.

Applicants believe that the use of a LAT filter allows for the generation of an improved foreground mask as compared to prior art methods of generating a foreground mask. Indeed, Applicants have shown that the use of the LAT filter allowed for comparatively more cell nuclei to be identified as compared with the prior art (see Example 3 and FIG. 9).

Filters are then applied to the image to selectively remove artifacts, e.g. small blobs, small discontinuities, other small objects, and/or to fill holes (1104). In some embodiments, morphological operators are applied to remove artifacts and/or fill holes. Indeed, any of the morphological operators known in the art may be applied provided that the application of the morphological operators results in the removal of artifacts and/or hole filling as needed.

Morphology is a set-theoretic approach that considers an image as the elements of a set and processes images as geometrical shapes. The basic idea is to probe an image with a simple, predefined shape, where the algorithm draws conclusions on how this shape fits or misses the shapes within the image. This simple probe is referred to as a structuring element. In some embodiments, a morphological operation is performed using a disk shaped structural element. In some embodiments, the radius of the disk shaped element ranges from about 2 to about 3. In other embodiments, the radius of the disk shaped element is 2.

Figure 5A:
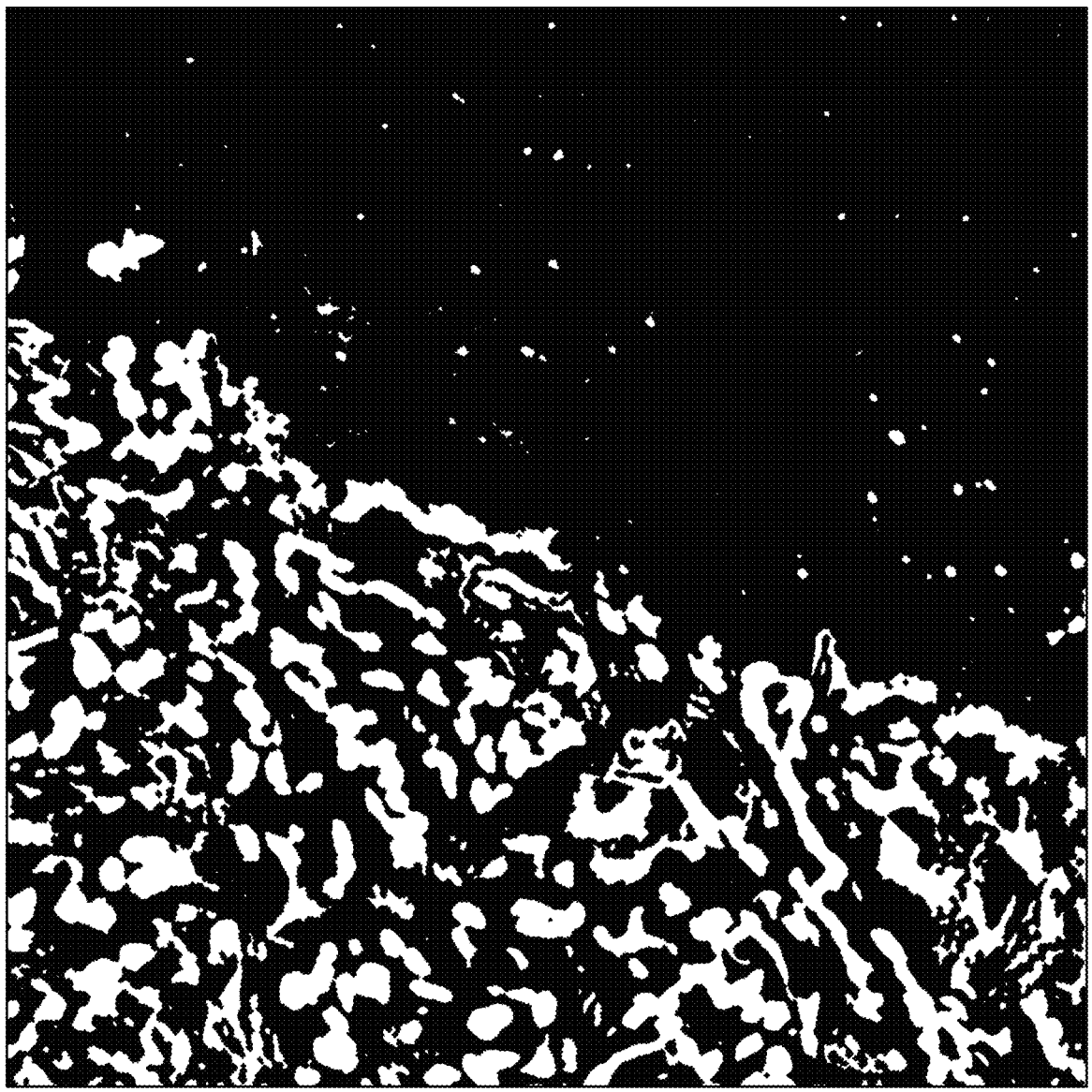
FIGS. 5A and 5B show the resulting mask after application of "closing" morphological operations to FIGS. 4A and 4B, respectively.
Figure 5B:
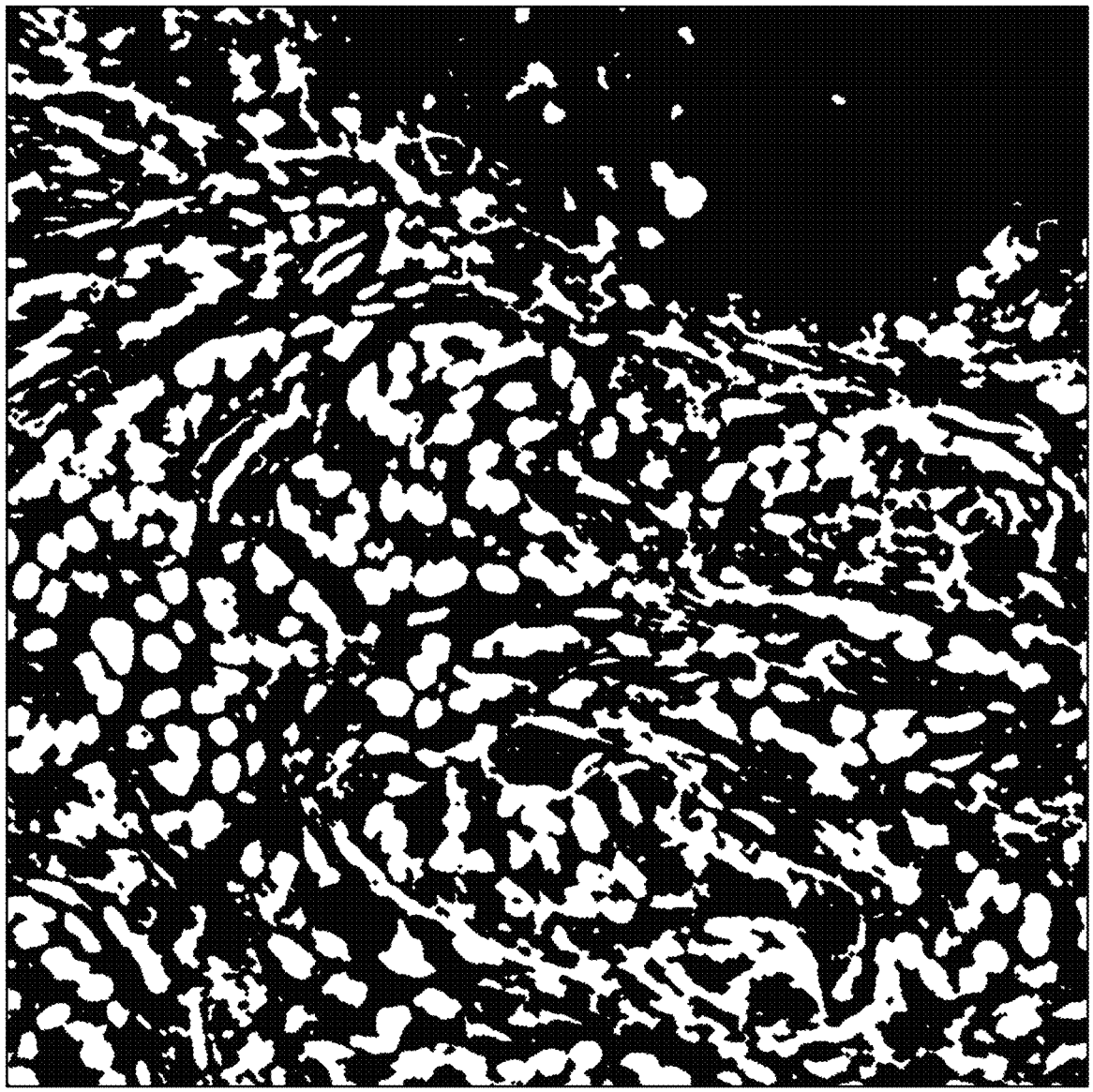
Figure 6A:
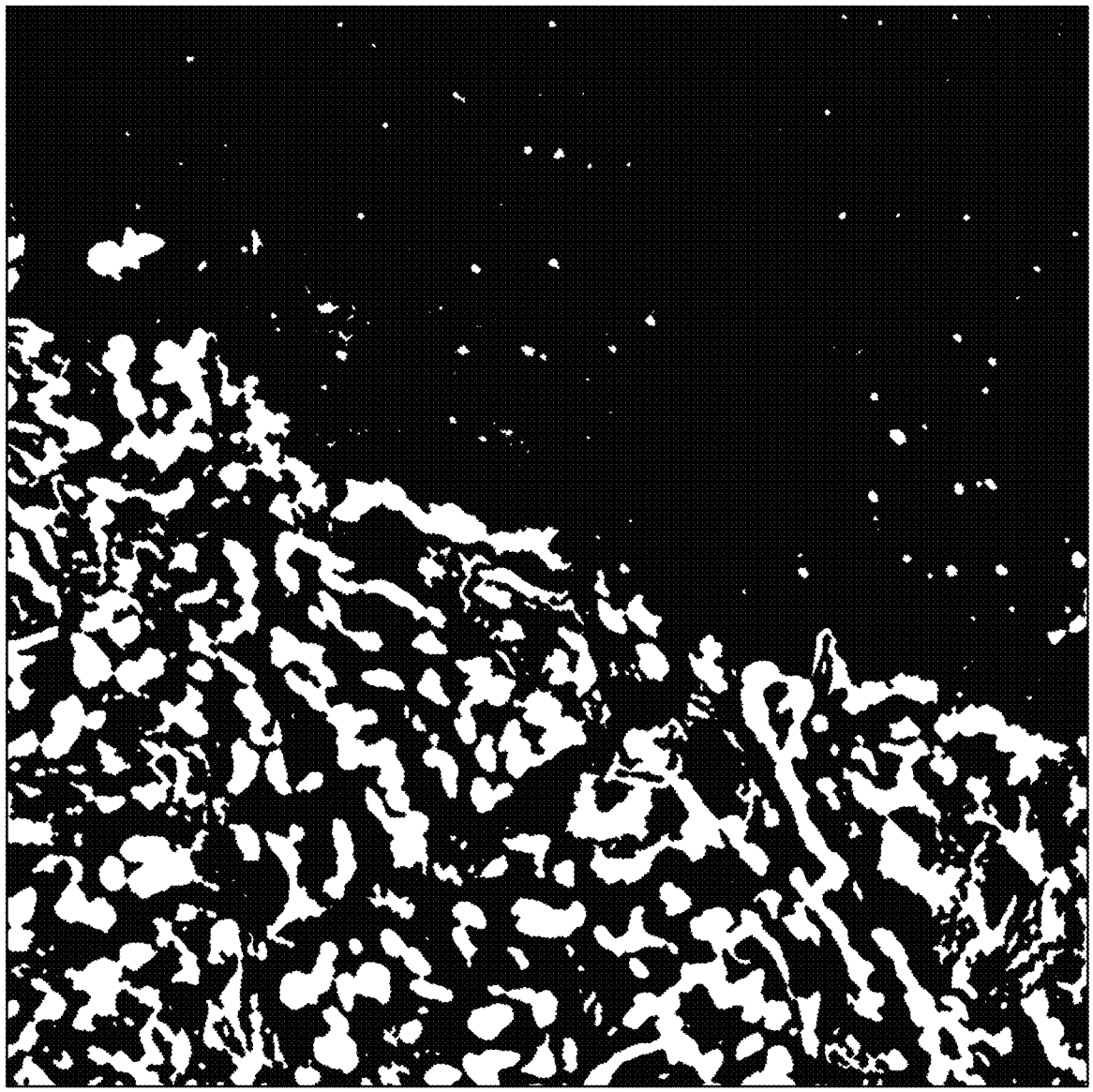
FIGS. 6A and 6B show the resulting mask after application of "fill holes" morphological operations to FIGS. 5A and 5B, respectively.
Figure 6B:
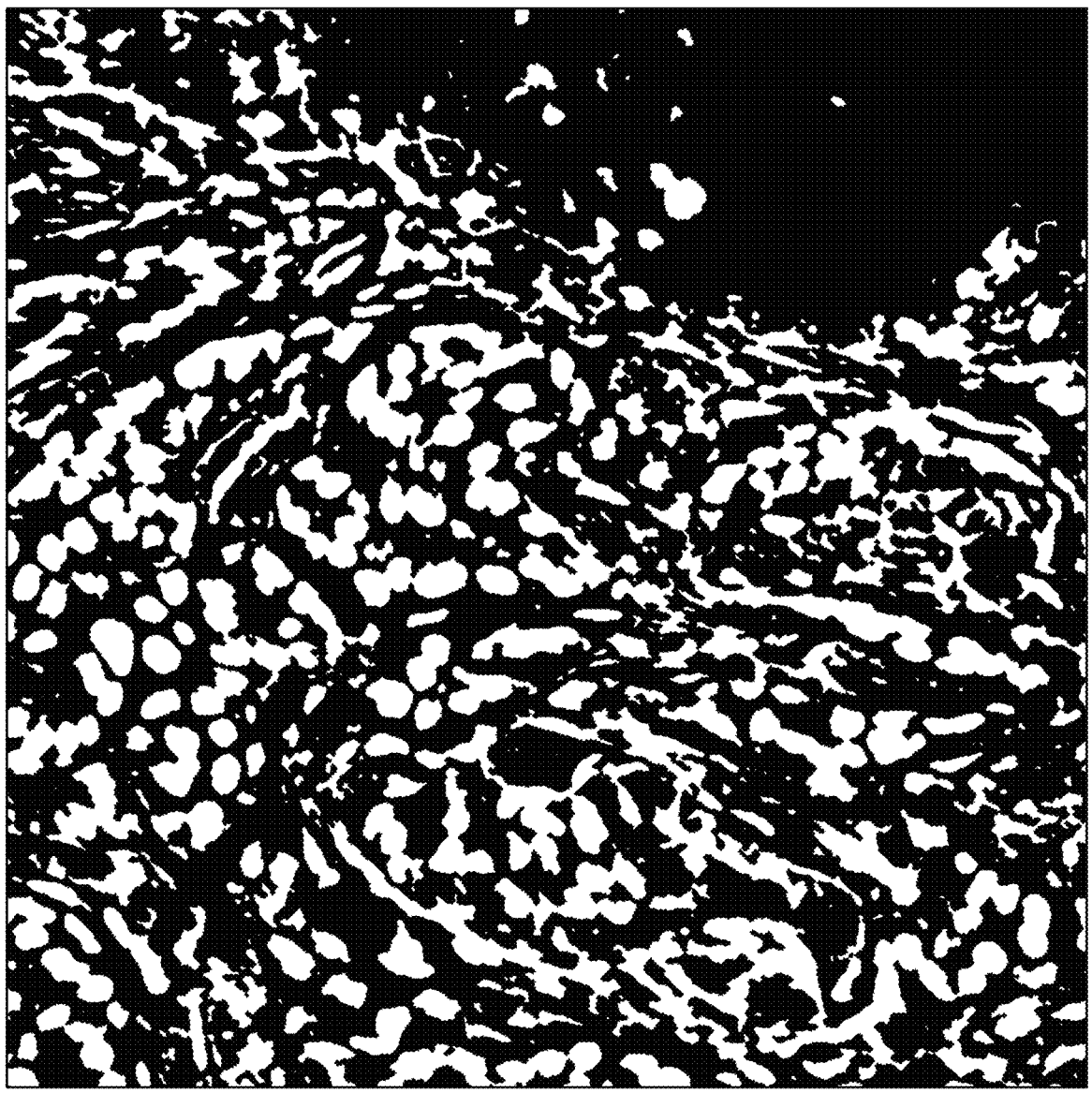

In some embodiments, a "closing" morphological operation is performed such that a circular nature of a foreground object may be retained. It is believed that "closing" fuses narrow breaks and fills small holes and gaps in the image. In some embodiments, when a "fill holes" morphological operation is performed, connected components is used to determine any "holes" having a size of less than or equal to about 150 pixels. It is believed that the "fill holes" operation assists in returning meaningful blobs, once any internal holes have been filled, and ultimately a more accurate segmentation mask is returned. FIGS. 5A and 5B show the resulting mask after application of the "closing" operations to the images in FIGS. 4A and 4B, respectively. FIGS. 6A and 6B show the resulting mask after application of the "fill holes" operations to the images in FIGS. 5A and 5B, respectively.

Alternatively, a hole may be filled by a morphological operation, namely a conditional dilation operation. For example, let A be a set containing one or more connected components. An array $X_0$ is formed (of the same size as the array containing A), whose elements are zeros (background values), except at each location known to correspond to a point in each connected component in A, which is set to one (foreground value). The objective is to start with $X_0$ and find all the connected components by the following iterative procedure:

$$X_k = (X_{k-1} \oplus B) \cap A \quad k=1,2,3,\ldots$$

where B is a suitable structuring element. The procedure terminates when $X_k = X_{k-1}$ with $X_k$ containing all the connected components of A. The results of the dot detection module are then provided to a classification module.

In some embodiments, a type of "Maximally Stable Extremal Regions" (MSER) procedure may optionally be carried out. The steps include (a) defining a blob frame large enough to hold the blob with some margin, (e.g. 1 full diameter of a "good nucleus"); (b) within that blob frame, find the mean threshold corresponding to the edge of the blob; the edge of the blob corresponds to the current detected border of a nucleus that separates intra-nucleus pixels from extra-nucleus pixels; (c) from 0.8 to 1.2 times this threshold (e.g. a range of about 0.8-about 1.2 times this threshold), step the threshold in many (e.g. at least 10) small increments and measure the area of the largest connected component (blob) in the blob frame; fill holes in it and measure its area; this area become successively smaller (or at most, be the same) as the threshold increases; (d) measure the successive differences of these areas, (e) select the threshold corresponding to the region of this series that, when applied on the digital image, results in a blob whose size has the minimum size difference to the blobs generated by the next-lower and next-higher one of the thresholds; in other words, the one of the series of thresholds is selected that corresponds to the region of this series that is nearest to zero (if there is a flat region of the curve of area difference versus threshold, select the middle of that region); (f) that threshold to find the largest blob in the blob frame; and (g) combine the resulting blobs into a single image the same size as the input image.

Thus, in MSER, the thresholds are applied in steps, and looking at the size of the resulting blobs. If a nucleus is well stained, and the threshold steps in the series of thresholds well chosen, then as the threshold is changed, the area of the resulting blob will be stable (or relatively more stable) for at least a few of the thresholds. If the area series is used for computing a series of area differences by subtracting each blob area value from the blob area generated by the previous threshold of the series, then in an ideal case the area difference will go to zero for at least a few elements of the threshold series. Usually, the situation is not ideal and the difference series does not drop to zero so in fact the threshold that is near the center of the part of the series of differences that is nearest to zero is selected.

In some embodiments, bigger blobs are split or divided (representative of nuclei that are "touching" one another), for example by a watershed transform. Watershed is a segmentation method that usually starts from specific pixels called markers and gradually floods the surrounding regions of markers (catchment basins) by treating pixel values as a local topography. It is believed that by splitting the blobs, an image having meaningful nuclei sizes may be obtained (such that there is less risk that nuclei are combined during the generation of the segmentation mask). For example, bigger blobs may be split up by breaking smaller "necks."

Figure 7A:
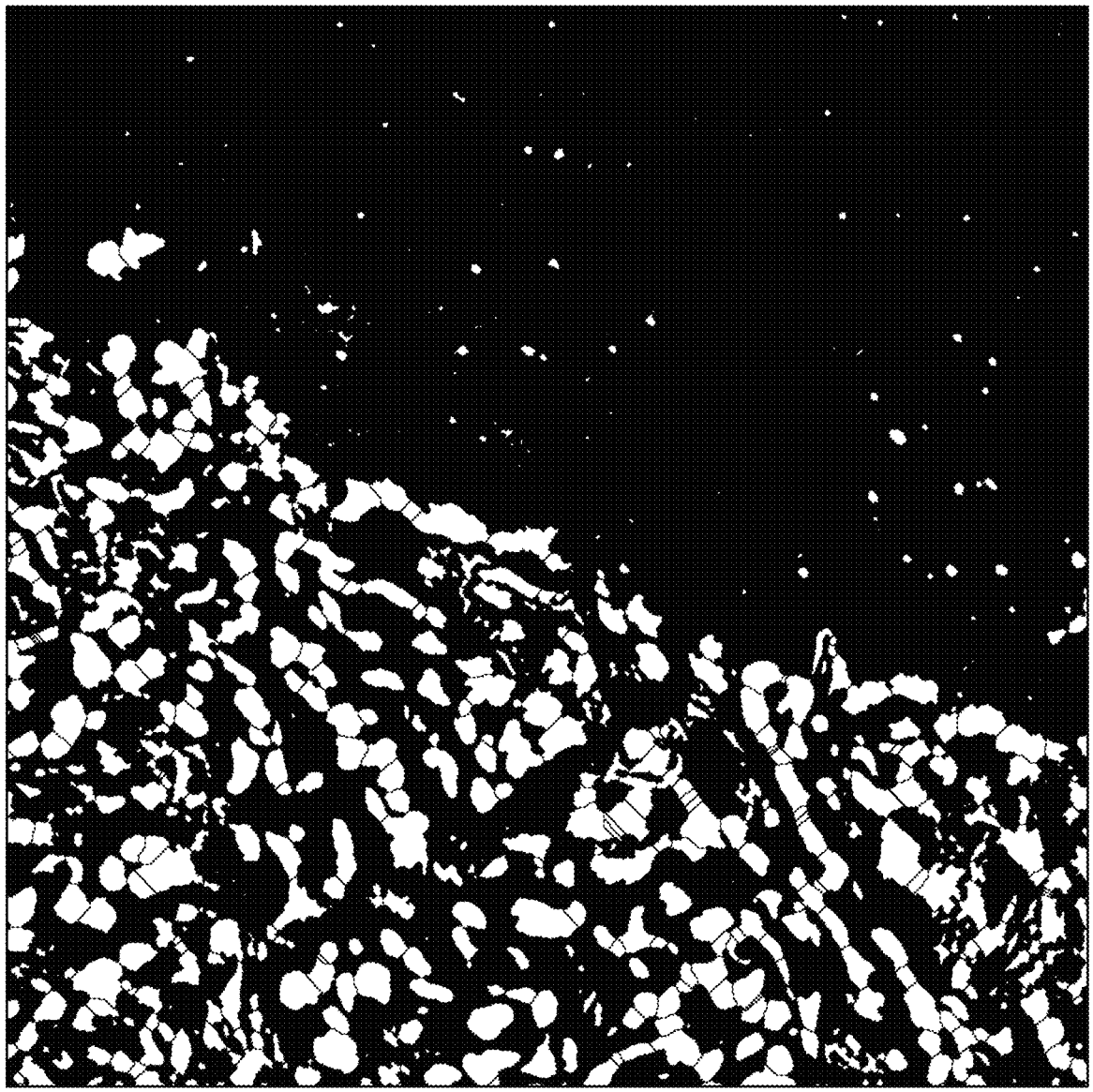
FIGS. 7A and 7B show the resulting mask after application of the watershed transformation filters to FIGS. 6A and 6B, respectively.
Figure 7B:
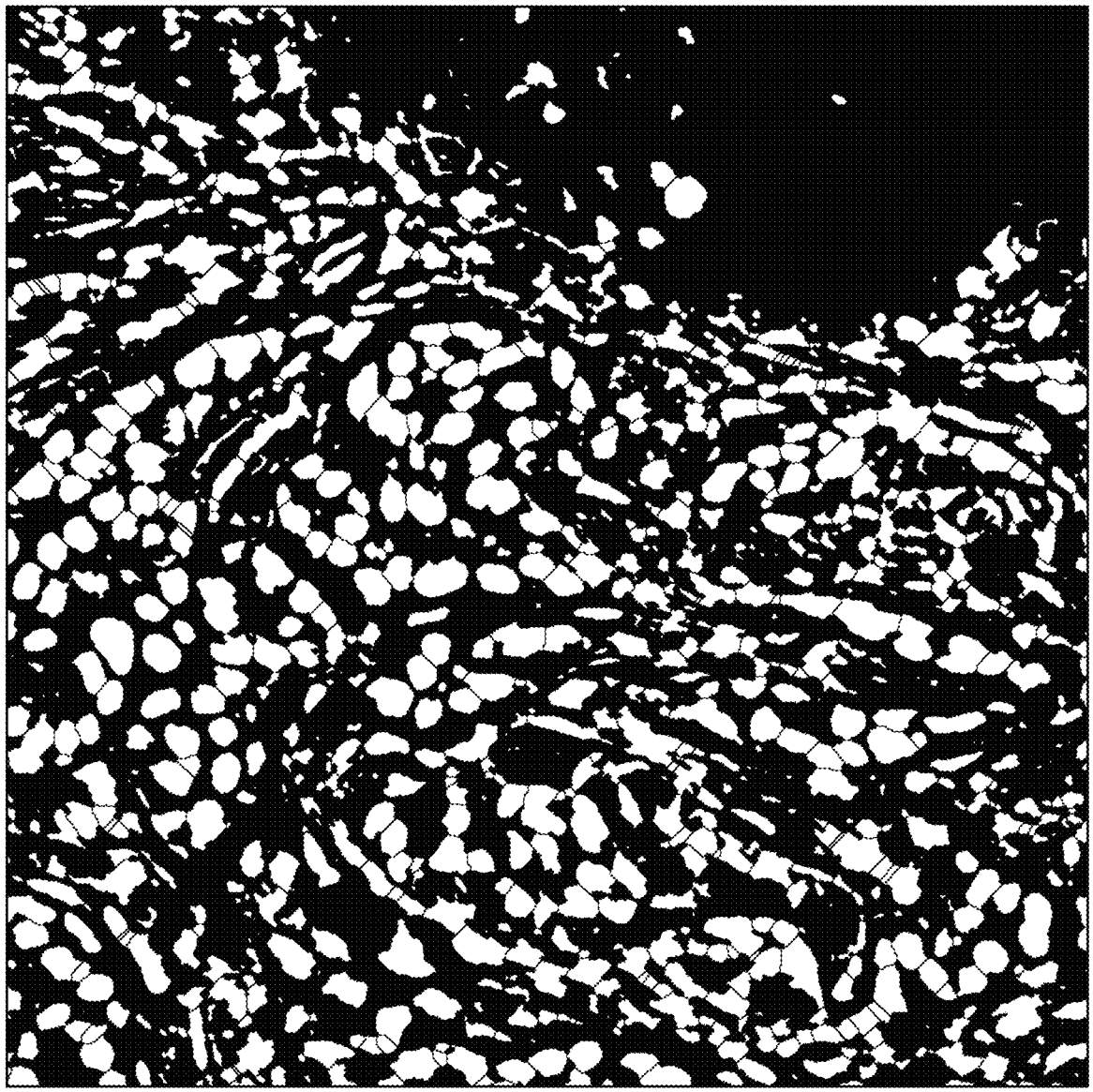

In some embodiments, a distance-based watershed is first applied, based on a binary image introduced as input (e.g. a binary image resulting from prior filtering steps). Distance transform is applied using the Euclidean distance (i.e. an the "ordinary," straight-line distance between two points in Euclidean space) between pixels while applying the distance transform. Then, regional maxima of the distance image are computed after smoothing to remove some local peaks. Once the robust maxima are obtained, marker based watershed is applied using the robust maxima as input. FIGS. 7A and 7B show the resulting mask after application of the watershed transformation filters to the images in FIGS. 6A and 6B, respectively.

Connected components labeling is then applied to the foreground segmentation mask (i.e. the binary image rendered through application of the segmentation filers described above, where the connected components labeling provides access to the individual nuclei in the segmentation mask. In some embodiments, the connected components labeling process is used to return contiguous regions in the binary image using standard algorithms, such as described by 'Hanan Samet and Markku Tamminen, "An improved approach to connected component labeling of images," in Proceedings of the IEEE Conference on Computer Vision and Pattern Recognition, Miami, Fla., 1986, pp. 312-318,' the disclosure of which is hereby incorporated by reference in its entirety. As applied here, connected components labeling scans an image and groups its pixels into components based on pixel connectivity, i.e. all pixels in a connected component have non-zero values in the corresponding locations in the binary foreground segmented mask and are in some way connected with each other.

Metric Computation Module

Once all of nuclei in the foreground segmentation mask have been combined via the connected components labeling process, and each pixel is labeled according to the component it was assigned to, metrics are computed. The metrics may be computed with a metric computation module, the steps of which are outlined in FIG. 12. In some embodiments, the metrics are computed based on signals present within the identified nuclei. The metrics are then evaluated to determine whether the nuclei meet certain criteria or threshold values and, if they do, the nuclei are ranked according to relative values of the computed metrics. In some embodiments, in the context of dual ISH for HER2 detection, the images are captured from tissue treated with a dual ISH probe, such that red signals (indicative of red dots) and silver signals ("black signals") (indicative of black dots) may be used to derive the various metrics. Signals from other ISH probes or other ISH protocols may be used in a similar manner.

In some embodiments, metrics are derived from (1) average absorbance of signals within the nuclei, e.g. computed within the RGB optical domain; and (2) average A channel of signals within the nuclei, e.g. computed with the LAB color space (step 1201). Thus, an average absorbance and average A channel are computed for each individual nucleus. Other image parameters, characteristics, and/or features may be used depending upon the particular ISH probes or other assays utilized.

Absorbance is defined as follows: an optical density representation (ROD, GOD, BOD) of a pixel (R,G,B) in 0-255 range is: ROD=$-\log(R/BK)$; GOD=$-\log(G/BK)$; BOD=$-\log(B/BK)$; where BK=assumed background intensity; BK was assumed to be 240; then absorbance OD=sqrt(ROD*ROD+GOD*GOD+BOD*BOD).

An average absorbance, based vote strength, is computed at all local maxima, which are found using radial symmetry voting on gradient magnitude of difference of Gaussian ("DoG") filter applied on the absorbance channel. Radial symmetry for blob detection and perceptual grouping is described further by Yang, Q., Parvin, B.: Perceptual organization of radial symmetries. Proc. of IEEE Int. Conf. on Computer Vision and Pattern Recognition (CVPR) 1, 320-325 (2004), the disclosure of which is hereby incorporated herein by reference. For tissue treated with ISH probes having silver ("black") signals, this allows identification of black dot centers. (see also Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein.)

In general, difference of Gaussians is a feature enhancement algorithm that involves the subtraction of one blurred version of an original image from another, less blurred version of the original. In the simple case of grayscale images, the blurred images are obtained by convolving the original grayscale images with Gaussian kernels having differing standard deviations. It is believed that blurring an image using a Gaussian kernel suppresses only high-frequency spatial information. Subtracting one image from the other preserves spatial information that lies between the range of frequencies that are preserved in the two blurred images. Thus, the difference of Gaussians is a band-pass filter that discards all but a handful of spatial frequencies that are present in the original grayscale image In some embodiments, for multi scale DoG, the parameters used are: standard deviation of Gaussian along x and y axes=0.75; the number of separate scales used=3; and the scale factor used to vary the standard deviation of Gaussian per successive scales=0.5. Once multi-scale DoG is performed, the DoG output corresponding to the finest resolution scale is used. In some embodiments, for radial symmetry, the parameters used are: minimum radius=1, maximum radius=2; the angle of the conical section used for radial symmetry voting=pi/4 radians; and all pixels considered for radii symmetry voting should have gradient magnitude value exceeding 0.185.

An average A channel based voting is computed at all local maxima, found using radial symmetry voting on the gradient magnitude difference of Gaussian applied on the A channel, (where A channel is obtained after conversion from RGB to the LAB color space). The LAB color space contains one luminance channel, L, and 2 chrominance channels, A and B. In the L*a*b color space, the "L" channel represents the brightness of a pixel, the "A" channel reflects the red and green components of a pixel, and the "B" channel represents the blue and yellow components of a pixel. Thus, positive A values denote pixels which are more visually red. For tissue treated with ISH probes having red signals, this allows identification of red dot centers. In some embodiments, the parameters of radial symmetry algorithm used here are: minimum radius=2; maximum radius=5; the angle of the conical section used for radial symmetry voting=pi/4 radians; and all pixels considered for radii symmetry voting should have gradient magnitude value exceeding 0.10.

For dual ISH applications having red and silver ("black") ISH signals, the number of local maxima found using radial symmetry on gradient magnitude of DoG applied on the A channel is regarded as the number of red dots. Similarly, the number of local maxima found using radial symmetry on gradient magnitude of DoG applied on the absorbance channel, is regarded as the number of black dots. For a nucleus to meet the required criteria for ranking, the nucleus must (1) have at least one black dot, (2) have at least one red dot, and (3) meet an area constraint (1202). Only those nuclei meeting these established criteria are retained (of course, the criteria may be adapted for other ISH assay or protocols where differently colored chromogens are utilized). In some embodiments, the area constraint considers nuclei having a minimum area ranging from about 450 pixels to about 3400 pixels. In some embodiments, the area constraint considers nuclei having a minimum threshold area of about 150 pixels.

No explicit dot detection and/or counting is performed at this stage to quantify the number of black dots and/or red dots. Rather, the information at this stage is collected to identify nuclei that meet certain criteria. In other words, a quick and approximate dot detection method is utilized at this stage and more sophisticated and elaborate dot detection methods may be used for those nuclei returned after segmentation and ranking (during downstream processing). Of course, the skilled artisan will recognize that the metrics described herein may be adapted and calculated on other channels or combinations of channels, or other image parameters, characteristics or features, to better identify signals of other in situ hybridization probes.

Next, the total number of nuclei that meet the predetermined criteria (N nuclei) are determined (1203). For example, let the total number or nuclei with at least one black dot and at least one red dot, and which meet the area constraint, be N nuclei. Next, the M top nuclei according to absorbance and the M top nuclei to according A channel are both picked. Next, three subsets of nuclei are identified, namely subsets S1, S2, and S3) (1204), where subset S1 denotes the set of M nuclei which rank the highest in average absorbance metric, and where subset S2 denotes the set of M nuclei which rank the highest in average A metric. The nuclei that are common to both the S1 and S2 subsets are grouped within subset S3. For dual ISH with black and red signals, it is believed that choosing nuclei with high average absorbance and high average A ensures that the chosen nuclei are strongly black (stronger black dots are generally high in absorbance) and strongly red (stronger red dots are generally higher in average A).

The number of nuclei within subset S3 is compared to a predefined threshold amount (e.g. a threshold number of nuclei) (1205). The pre-defined threshold may range from about 20 to about 40 nuclei. In some embodiments, the threshold is about 30 nuclei.

If the number of nuclei in subset S3 exceeds the pre-defined threshold, a ratio of different nuclear signals (e.g. a black-to-red dot signal ratio) is computed based on the number dots computed after radial symmetry for those nuclei within the S3 subset (1206). Only the nuclei within subset are sorted in descending order based on the computed ratio to return a ranked list of the "most scoreable" nuclei. The list of "most scoreable" nuclei is aligned with dual ISH scoring guidelines, which dictate that when multiple "easy-to-score" nuclei are available, that the medical professional is expected to score those nuclei which are more amplified (i.e. those with a higher black-to-red ratio).

If the number of nuclei in subset S3 is less than or equal to the predefined number, a black-to-red ratio is still determined, but in this instance all of the nuclei are sorted (1206). It is believed that when the subset S3 is less than or equal to the predefined threshold value, the nuclei have signal characteristics that are neither strongly indicative for a first ISH signal or a second ISH signal (e.g. those nuclei having strongly black characteristics are not the same nuclei as those which have strongly red characteristics). Without wishing to be bound by any particular theory, it is believed that this could be due, at least in part, to improper laboratory techniques used in the preparation of the tissue slides (e.g. improper staining).

Figure 8A:
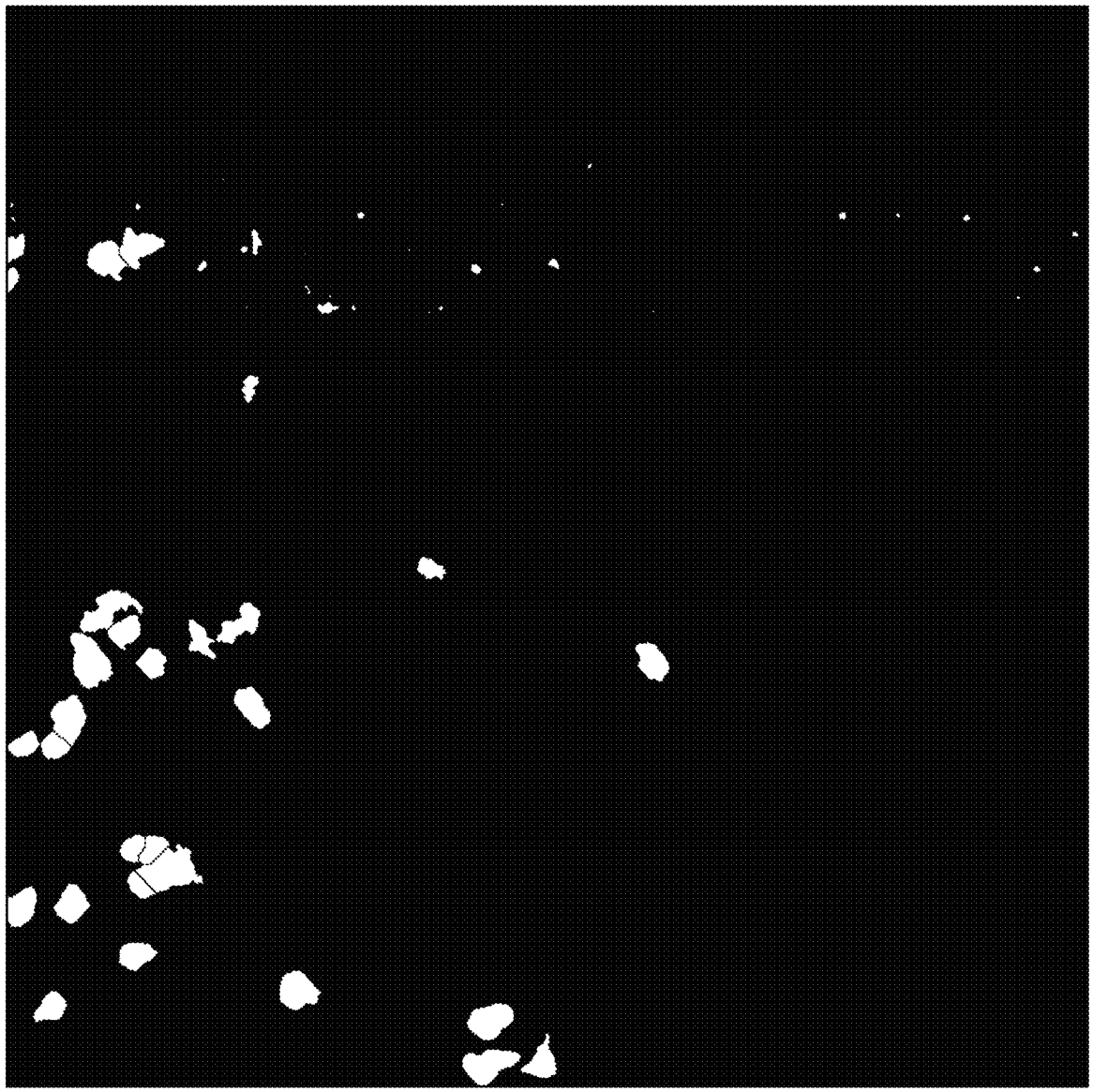
FIGS. 8A and 8B show the retained mask after the top N nuclei are selected.
Figure 8B:
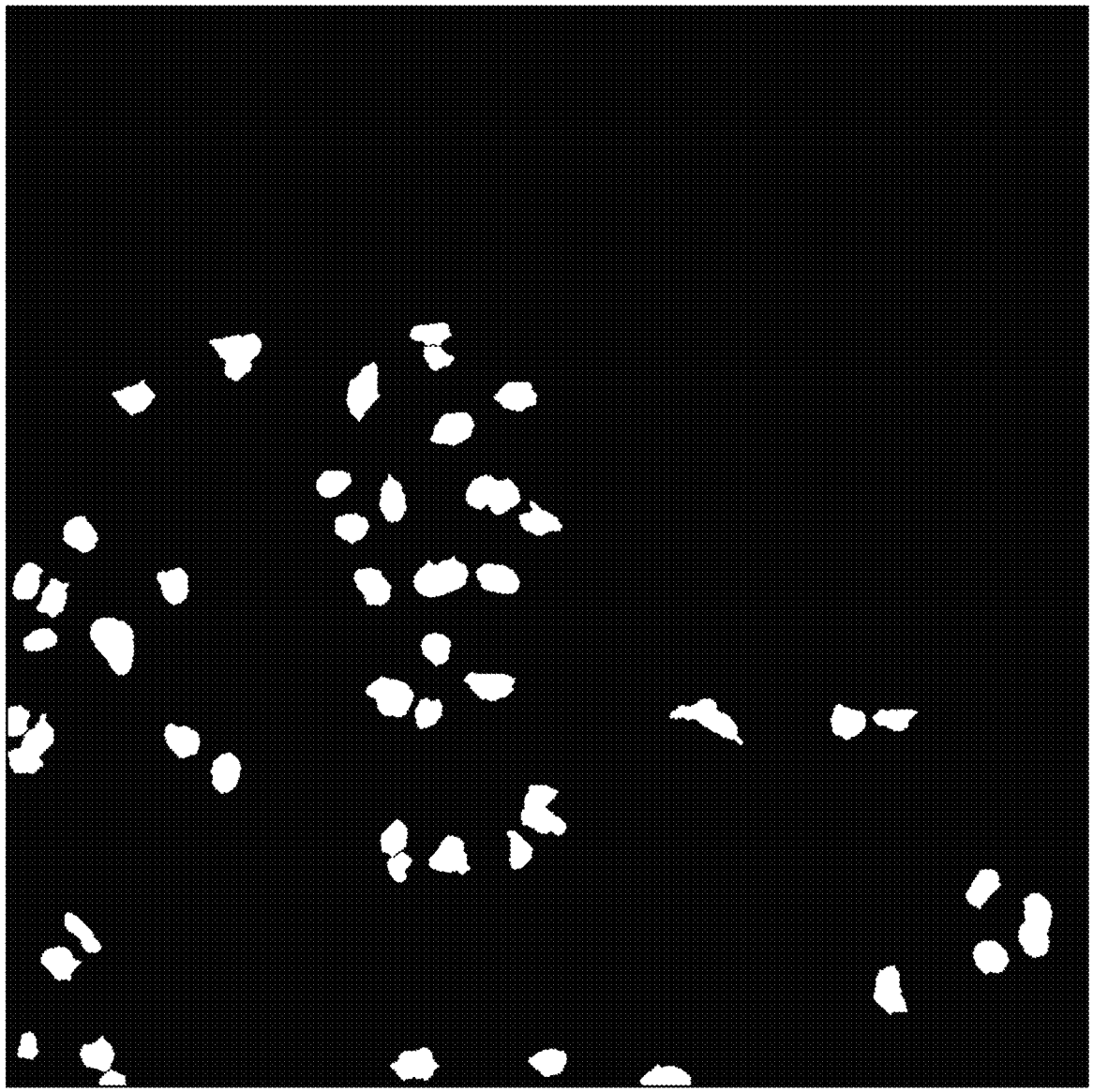

Based on the signal ratios (e.g. black-to-red signal ratios), the top number of nuclei (N1) may be returned as an output after the nuclei are sorted in descending order (1206). In some embodiments, the nuclei are re-ranked based on a combination of the computed metrics (a "composite score"), e.g. (absorbance*A channel). The re-ranked list, sorted in descending order based on the composite score, is may be selected as the final ranked list and used as output. FIGS. 8A and 8B show the retained mask after the top N nuclei are selected.

Once nuclei ranking is performed as described above, dot detection and classification algorithms may be applied to those ranked nuclei. For example, to automatically score a breast tissue sample, candidate nuclei are selected for quantitative analysis. The computer system 14 automatically counts different features (e.g., HER2 genes, chromosome 17s, etc.) and determines the ratio of the number of features. Additional nuclei can be scored. A diagnosis can be made based, at least in part, on the ratios. To evaluate whether the tissue sample (e.g., breast tissue) is a carcinoma, the computer system 14 can assist the user in obtaining information about the selected region by, for example, detecting the amplification of genes by evaluating the ratio of the number of HER2 gene signals to the number of chromosome 17 signals.

The tissue is scored based on the signals corresponding to HER2 genes and chromosome 17s to determine the HER2/chromosome 17 ratio. Based on the ratio, the specimen's HER2 gene is determined to be amplified or not amplified. If the determined score is Score<=1.8=>Bin 1 (regarded as non-amplified or negative, from a score perspective); if the Score>1.8 and Score<=2.2=>Bin 2 (when the score is in this range, it is difficult to make a decision and 20 more nuclei are considered to decide amplified/non-amplified); and if the Score>2.2=>Bin 3 (regarded as amplified or positive).

Any of the images evaluated by the computer system may be pre-processed prior to any identification of features, computation of metrics, or evaluation by the computer system. For example, noise reduction filters and other enhancing filters may be run as known to those of ordinary skill in the art. The processes disclosed herein may also be repeated any number of times to evaluate any desired areas of interest.

In a further aspect, the disclosure relates to an image analysis method for segmenting and ranking nuclei in a digital image of a tissue specimen. The tissue specimen is stained with at least a first and a second in situ hybridization stain having different colors. The method is implemented in an image analysis system and comprises:

segmenting the digital image for generating a foreground segmentation mask, the foreground segmentation mask being selectively indicative of image regions representing nuclei;

identifying individual nuclei in foreground regions identified by the foreground segmentation mask whose size exceeds a nucleus size threshold value; the nucleus size threshold is, for example, empirically determined and may represent a typical size of a nucleus of a cell or tissue type of interest. Any nucleus detection algorithm known in the art may be applied, e.g. threshold-based approaches and/or morphology based approaches and others.

for each of the identified nuclei, performing an initial dot detection routine in a first channel image derived from the digital image for identifying first dots in said nucleus and in a second channel image derived from the digital image for identifying second dots in said nucleus, each first dot being a blob whose pixel values in the first channel image correlate with the amount of first stain, each second dot being a blob whose pixel intensities in the second channel image correlate with the amount of second stain; a "dot" as used herein is a region of an image in which some properties are constant or approximately constant; all the pixels in a dot can be considered in some sense to be similar to each other. Thus, the term "dot" is a synonym to "blob" and can in particular refer to a "small blob" having a size that is typically significantly smaller than a cell nucleus represented in a digital image;

for each of the identified nuclei, counting the number of first dots and the number of second dots in said nucleus; and ranking a plurality of the identified nuclei in descending order according to a ratio of the first and second dots in each nucleus.

Said features may be advantageous as a ranking method for nuclei that provides a more accurate and robust selection of nuclei for an in-depth analysis by a pathologist is provided. Emphasis of this approach does not lie on identifying nuclei (or nuclei) which have a particular shape but rather on identifying nuclei having a particular ratio of first and second dots relating to in-situ-hybridization signals of different colors. This may be advantageous as the shape of nuclei may be incorrectly identified by the segmentation process or may even be modified by the cell preparation process. To the contrary, the ratio of first and second staining signals is more robust against segmentation errors and may allow a more robust identification of the nuclei comprising relevant biological information such as for example the ratio of a gene copy number versus the number of chromosomes normally comprising said gene.

According to embodiments, the image analysis system performs for each of a number of top-ranked nuclei a refined dot detection routine for identifying refined versions of the first and second dots in said nucleus. The initial dot detection routine is computationally less expensive than the refined dot detection routine. The refined dot detection routine may comprise, for example, the application of additional morphological filters and quality tests for checking if e.g. the shape and morphology of the top-ranked nuclei corresponds to an expected morphology. In addition, holes in the dots may be filled and noise signals may be filtered out. In case the refined dot detection routine determines that a particular top-ranked nucleus does not meet the morphological and/or quality criteria, said nucleus is removed and the next-highest ranked nucleus, if any, is added to the list of the top-N ranked nuclei. Said features may accelerate the image processing method because the refined and computationally more expensive dot detection routine is executed only for the nuclei that are output as the most relevant, top-ranked nuclei.

The image analysis system can be, for example, a digital data processing device, e.g. a computer, comprising an interface for receiving image data from a slide scanner, a camera, a network and/or from a storage medium.

According to embodiments, each first dot is indicative of an individual copy of a particular gene copy, e.g. a HER2 gene copy. The first color corresponding to the first stain may be, for example, black in case a silver-staining is used. Each second dot is indicative of an individual chromosome typically comprising said particular gene, e.g. chromosome 17 for the HER2 gene. The second color corresponds to the second stain and may be red, for example.

According to some exemplary embodiments, each pixel in the digital image corresponds to approximately 0.25 microns by 0.25 microns of tissue slide. The smallest detectable dot had an area of 4-5 pixels.

According to embodiments, the foreground segmentation of the digital image for generating the foreground segmentation mask comprises:

representing color components of the digital image as a plurality of different color vectors, each of said vectors representing a different one of the color components; For example, the digital image may be an RGB image having a width of x pixels and a height of y pixels. The R(red) component of each pixel is represented ("flattened") in a one-dimensional vector of R-values comprising x times y elements. Likewise, the G(green) component of each pixel is represented in a one-dimensional vector of G-values and the B(blue) component of each pixel is represented in a one-dimensional vector of B-values, the vectors respectively comprising x times y elements. The "flattening" may be implemented, for example, by applying the NumPy's flatten( ) method on each of the R, G and B channel images. Then, the generated three R, G and B vectors are used as input for performing the principal component analysis;

applying principal component analysis on the plurality of color vectors for obtaining a plurality of principal components; identifying a median (pc1_median) of the first principal component (pc1) obtained in the principal component analysis;

computing a global threshold, the global threshold being derived from the median (pc1_median); For example, the computation of the global threshold may comprise the following steps: computing a median absolute deviation value (pc1_MAD) from the identified median. The median absolute deviation (MAD) is a robust measure of the variability of a univariate sample of quantitative data. It can also refer to the population parameter that is estimated by the MAD calculated from a sample. According to embodiments, an additional step is performed to ensure that the MAD value is not above a given minimum value, e.g. 0.2: pc1_MAD=min(0.20, pc1_MAD). This global value of 0.20 is empirically determined so that there is a reasonable value assigned to MAD value of pc1. The computation of the threshold as a derivative of the median is performed, according to embodiments, according to the following formula: pc1_threshold=pc1_median−const*pc1_MAD, wherein const is typically a value between 0.1 and 0.2, e.g. 0.15. The threshold value returns a binary mask which is ON, i.e., has unmasked pixels where pc1 value<pc1_threshold. The pc1 channel is that channel which captures most of the image variation and is visually similar to the grayscale image in most cases. A low pc1 value denotes the foreground region (representing nuclei); and identifying pixels whose first principal component value is lower than the global threshold and using said identified pixels as foreground pixels in the foreground segmentation mask.

Said features may be advantageous, as only the first principal component of the PCA analysis is used for generating the foreground mask. Thus, the noise that typically also contributes to pixel intensity variance but is not contained in the first principal component is filtered out.

According to embodiments, the foreground segmentation of the digital image for generating the foreground segmentation mask further comprises:

representing the first principal component obtained in the principal component analysis as a first principal component image (I), each pixel in the first principal component image pixel having assigned the value of said pixel specified in the first principal component for said pixel;

generating a smoothed version (I') of the first principal component image by applying a 2D Gaussian filter on the first principal component image; according to embodiments, the 2D Gaussian filter has a window size (w) and a scale factor (s) and a standard deviation (sd). The standard deviation is a function of the window and the scale factor, e.g. according to standard deviation sd=w/s. A window is the area unit over which the local adaptive thresholding is to be performed. A scale parameter is a special kind of numerical parameter that indicates and corresponds to the spread out (e.g., width at half height) of a probability distribution or a filter kernel (of the Gaussian filter). The window size preferentially is approximately 3 to 10 times the size of a typical nucleus and the scale factor is empirically determined on ground truth data as a scale factor value suitable for predominantly smoothing (i.e., reducing) intra-nucleus variability rather than inter-nucleus variability;

performing a locally adaptive thresholding (LAT) on the foreground regions of the digital image in addition to the global thresholding, wherein performing the locally adaptive thresholding comprises identifying pixels whose pixel value in the first principal component image (I) is lower than the corresponding pixel value in the smoothed version (I') of the first principal component image, and selectively using the identified pixels as foreground pixels in the foreground segmentation mask.

Thus, according to the above described embodiment, pixels fulfilling the local threshold criterion I<I' (i.e. pixels whose pixel value in the pc1 channel I is less than the respective pixel values in the smoothed image I'), are more likely to be foreground and are therefore considered as foreground pixels when creating the foreground segmentation mask. After applying global and locally adaptive thresholding, the pixels retained as foreground are those which obey global threshold constraints (pc1 image value<global pc1_threshold) and local threshold constraints (I<I', where I' is a function of the window w and scale factor s. Across an image, the darkness of a stain can vary quite a bit from nucleus to nucleus. By using a threshold (the I' value in the smoothed version of the first principal component image) that is smaller in fainter areas and larger in others) a locally adaptive threshold is provided that is robust against said staining variability across a tissue slide. Here, the window and scale factors are chosen empirically to get foreground pixels that accurately represent where the nuclei pixels are: the window needs to be at least several nuclei diameters (10-20, typically) in each dimension and a scale factor of 3 to 5 has been observed to usually provide the best results. Typically, the pixels inside a nucleus are darker than their immediate neighborhood—hence a LAT method which captures locally darker pixels captures the foreground nuclei better. The LAT can be performed, for example, as described in "An Introduction to Digital Image Processing" by Wayne Niblack (ISBN:87-872-0055-4, page 115).

According to embodiments, the identification of the pixels whose first principal component value is lower than the global threshold is executed before the locally adaptive thresholding is applied. This order of applying the global and local thresholds has been observed to further increase accuracy of foreground segmentation.

According to embodiments, additional filters to selectively remove artifacts, remove small blobs, remove small discontinuities, fill holes, and split up bigger blobs are applied after application of the locally adaptive thresholding filter. Said optional filters may comprise morphological filters and transformations and/or watershed transformations. Preferentially, said additional filters are applied by a refined dot detection routine selectively on nuclei having already been chosen for the ranking (e.g. after having determined that the nuclei meet a nucleus size threshold and comprise at least one first and at least one second dot) or having already been ranked. This may save computational resources as the refined dot detection is performed only for image regions which have already been identified as (relevant) nuclei.

According to embodiments, the image analysis method further comprises:

generating the first channel image as a derivative of the digital image, the first channel image being an absorbance image; an "absorbance image" as used herein is a representation of a digital image in common logarithm of the ratio of each R, G and B component to a background intensity value. For example, an absorbance image is a representation of an RGB image having pixel values in a [0-255] range for each R, G and B component, in the optical density domain. Thereby, the red (R) component of a pixel is represented as ROD, the green (G) component of a pixel is represented as GOD and the blue component (B) of a pixel is represented as BOD, e.g. according to the formulas: ROD=−log(R/BK); GOD=−(G/BK); BOD=−log(B/BK); the parameter BK is an assumed background intensity of the slide on which the tissue specimen is mounted, e.g. a background intensity of glass. Typically, the BK value for glass is between 230 and 255, e.g. 240. The absorbance value OD of each pixel in the absorbance image may be computed according to OD=sqrt(ROD*ROD+GOD*GOD+BOD*BOD);

identifying local absorbance maxima in the absorbance image, wherein local absorbance maxima are pixels whose absorbance values exceed an absorbance threshold, and using the identified local absorbance maxima as prospective first dots; the absorbance threshold may have been identified empirically by evaluating training images comprising correctly annotated first dots;

computing a first DoG image from the absorbance image by applying at least one pair of Gaussian filters whose Kernels have a different standard deviation on the absorbance image and by subtracting the two filtered images output by the Gaussian filters from each other, the first DoG image being a difference-of-Gaussian image; For example, the following parameters may be used for computing the at least one DoG image: standard deviation of Gaussian along x and y axes=0.75. In case multiple DoG images are computed ("multi scale DoG", pyramidal DoG), an m-layered DoG image pyramid is computed: a first DoG pyramid layer image is computed by applying a pair of Gaussian filters on the original digital image; then, the first DoG pyramid layer image is used as input to a further pair of Gaussian filters, wherein the standard deviation of the two Gaussian filters of the second filter pair differ by a predefined scale factor from the standard deviation of the two Gaussian filters of the first filter pair. The resulting second DoG pyramid layer image is then subjected to the same procedure, and the cycle is repeated multiple (m−1) times, e.g. three times. Each cycle of this process results in a new DoG image with a modified and often increased DoG signal. If illustrated graphically, the entire multi-scale DoG representation will look like a pyramid, with the original image on the bottom and each cycle's resulting new DoG image stacked one atop the other. For example, three iterations may be used. The scale factor used to vary the standard deviation of Gaussian per successive scales can be, for example, 0.5. Once multi scale DoG is done, the DoG output corresponding to the finest resolution scale (the top most DoG image in the pyramid) is used.

generating a first gradient image as a derivative of the first DoG image, each pixel of the first gradient image comprising a gradient being indicative of the amount and direction of a DoG value change in its neighborhood;

identifying the ones of the prospective first dots whose pixel gradients in the first gradient image meet one or more radial symmetry criteria and using said identified prospective dots as the identified first dots. For example, for determining if a particular prospective first dot is sufficiently radial symmetric, the following criteria can be checked: minimum radius=1, maximum radius=2, the angle used for radial symmetry voting=pi/4 radians, and all pixels considered for radii symmetry voting should have gradient magnitude value exceeding 0.185. A reference of the radial symmetry method for blob detection and perceptual grouping is: Yang, Q., Parvin, B.: Perceptual organization of radial symmetries. Proc. of IEEE Int. Conf. on Computer Vision and Pattern Recognition (CVPR) 1, 320-325 (2004).

According to embodiments, the image analysis method further comprises:

generating the second channel image as a derivative of the digital image, the second channel image being the A or B channel image of a LAB color space representation of the digital image, wherein the one of the A and B LAB color space channels is used as the second channel image where the second in-situ-hybridization stain has a higher signal amplitude; For example, in case the second stain is a red or reddish stain, the A channel of the LAB color space is used as the second channel;

identifying local maxima in the second channel image whose intensity values exceed a chrominance threshold and using the identified local maxima as prospective second dots; the chrominance threshold may have been identified empirically by evaluating training images comprising correctly annotated second dots;

computing a second DoG image from the second channel image by applying at least one pair of Gaussian filters whose Kernels have a different standard deviation on the second channel image and by subtracting the two filtered images output by the Gaussian filters from each other, the second DoG image being a difference-of-Gaussian image;

generating a second gradient image as a derivative of the second DoG image, each pixel of said second gradient image comprising a gradient being indicative of the amount and direction of a DoG value change in its neighborhood in the second DoG image;

identifying the ones of the prospective second dots whose pixel gradients in whose gradients in the second gradient image meet one or more radial symmetry criteria and using said identified prospective second dots as the identified second dots. For example, the radial symmetry criteria used here can be: minimum radius=2, maximum radius=5, the angle of used for radial symmetry voting=pi/4 radians, and all pixels considered for radial symmetry voting should have gradient magnitude value exceeding 0.10.

According to embodiments, at this stage, only an initial, (rough and approximate) dot detection is performed to count the number of first (e.g. black) and second (e.g. red) dots per nucleus. The more sophisticated, computationally more demanding dot detection ("refined dot detection") is performed later and only for those nuclei returned after foreground segmentation and nucleus ranking. The computation of the first and second image channels, the first and second gradient images and the evaluation of the radial symmetry criteria are computationally comparatively cheap. The number of local maxima in the first image channel meeting radial symmetry criteria on gradient magnitude of a DoG image is considered as the number of first dots and the number of local maxima found e.g. in the A channel and that meet radial symmetry criteria in a second gradient image is regarded as the number of second (e.g. red) dots.

According to embodiments, the method further comprises:

identifying all nuclei comprising at least one first dot and at least one second dot; and identifying all nuclei whose size exceeds an empirically determined nucleus size threshold (e.g. exceeds an area of at least 150 pixels); and selectively ranking identified nuclei comprising at least one first and at least one second dot and whose size exceeds the nucleus size threshold.

This feature may be advantageous as errors resulting from wrongly identified nuclei may be prohibited from the beginning.

According to embodiments, the method further comprises identifying the top N number of the ranked nuclei by:

segregating the identified total number of nuclei into three subsets, where a first subset comprises nuclei ranked as having the highest average pixel values in the first channel image, a second subset comprises nuclei ranked as having the highest average pixel values in the second channel image, and a third subset comprises nuclei common to both the first and second subsets; and evaluating whether the number of nuclei in the third subset is identical to or exceeds the number N;

if yes, ranking the nuclei in the third subset according to the ratio of first to second dots and using the top N nuclei of the third subset as the identified top N number of ranked nuclei; and if no, re-ranking all nuclei according to a derivative value computed for each nucleus as a function of the average pixel values of said nucleus in the first channel image and of the average pixel values of said nucleus in the second channel image and using the top N nuclei of the re-ranked nuclei as the identified top N number of ranked nuclei; for example, said function can be a product, e.g. a product of an average absorbance value and an average A-channel intensity value.

Then, the image analysis system outputs the identified top N number of the ranked nuclei.

According to embodiments, the image analysis method further comprises:

outputting the ranked nuclei or a top N number of the ranked nuclei via a graphical user interface, the outputting comprising one or more of:

generating a heatmap in which the ranks or rank intervals of the output ranked nuclei are represented as colors, the heatmap being presented as a complete or partial overlay of the digital image;

highlighting at least a top N number of the ranked nuclei, the color or brightness of the highlighting correlating with the rank of the nuclei.

Said features may allow a pathologist to quickly identify e.g. the top-10 or top-20 nuclei in a tissue slide that are particularly well suited for revealing relevant information relating e.g. to tumor classification and staging, tumor prognosis and other kinds of diagnostic questions. Said top-ranking nuclei may comprise a particularly high ratio of a gene-copy-number to a chromosome-copy number of a chromosome normally comprising said gene. In other examples, the two or more in-situ-hybridization signals and respective stains may correlate with the copy number of two or more different genes located on the same or on different chromosomes.

In a further aspect, the invention relates to an image analysis system configured for segmenting and ranking nuclei in a digital image of a tissue specimen. The tissue specimen is stained with at least a first and a second in situ hybridization stain having different colors. The image analysis system comprises a processor configured for:

segmenting the digital image for generating a foreground segmentation mask, the foreground segmentation mask being selectively indicative of image regions representing nuclei;

identifying individual nuclei in foreground regions identified by the foreground segmentation mask whose size exceeds a nucleus size threshold value; [may be empirically determined]

for each of the identified nuclei, performing an initial dot detection routine in a first channel image derived from the digital image for identifying first dots in said nucleus and in a second channel image derived from the digital image for identifying second dots in said nuclei, each first dot being a blob whose pixel values in the first channel image correlate with the amount of first stain, each second dot being a blob whose pixel intensities in the second channel image correlate with the amount of second stain;

for each of the identified nuclei, counting the number of first dots and the number of second dots in said nuclei; and ranking a plurality of the identified nuclei in descending order according to a ratio of the first and second dots in each nuclei.

The computer system of the present disclosure may be tied to a specimen processing apparatus which can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or nonaqueous-based antigen retrieval solutions, antigen recovering buffers, etc.), or the like.

Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes. For example, probes can include, without limitation, a hapten-labeled specific binding moiety, a DNA probe (e.g., DNP-labeled DNA probe), a nitroaryl compound, dinitrophenol, an electron-deficient aromatic compound, a probe hybridization solution, or other type of ISH probes. ISH can involve a labeled complementary DNA or RNA strand (i.e., probe) to localize a specific DNA or RNA sequence in a portion or section of tissue (in situ), or, if the tissue is small enough, in the entire tissue (whole mount ISH).

In some embodiments, a cocktail assay applied by the processing apparatus includes different reagents. For example, one cocktail assay includes the ULTRAVIEW SISH Detection Kit (Ventana Medical Systems, Inc., p/n 780-001), the INFORM HER2 DNA Probe (Ventana Medical Systems, Inc., p/n 780-4332), the Rabbit Anti-DNP Antibody (Ventana Medical Systems, Inc., p/n 780-4335), the Rabbit Anti-HER2 (4B5) Antibody (Ventana Medical Systems, Inc., p/n 800-2996), the ULTRAVIEW Universal Alkaline Phosphatase Red Detection Kit (Ventana Medical Systems, Inc., p/n 760-501), the silver wash (Ventana Medical Systems, Inc., p/n 780-002), and/or the INFORM Chromosome 17 Probe (Ventana Medical Systems, Inc., p/n 780-4331). Another cocktail assay is the INFORM HER2 Dual ISH DNA Probe sold by (Ventana Medical Systems, Inc.), which includes the INFORM HER2 Dual ISH DNA Probe Cocktail (Ventana Medical Systems, Inc., p/n 800-4422), the HybReady (Ventana Medical Systems, Inc., p/n 780-4409), the ultraView SISH DNP Detection Kit (Ventana Medical Systems, Inc., p/n 800-098), the ultraView Red ISH DIG Detection Kit (Ventana Medical Systems, Inc., p/n 800-505), the ultraView Siler Wash II (Ventana Medical Systems, Inc., p/n 780-003), and/or the HER2 Dual ISH 3-in-1 Xenograft Slides (Ventana Medical Systems, Inc., p/n 783-4332). Other cocktail assays can be used. Cocktail assays can be used to quantitatively detect amplification of the HER2 gene via two color chromogenic ISH in formalin-fixed, paraffin-embedded tissue specimens of human breast cancer and gastric cancer, including the gastro-oesophagal junction and can be an aid in the assessment of patients for whom Herceptin (trastuzumab) may be a treatment option. In yet other protocols, the cocktail assay is the VENTANA HER2 DNA Probe Assay sold by Ventana Medical Systems, Inc., p/n 800-4422. U.S. patent application Ser. No. 11/809,024 (corresponding to U.S. Patent Publication No. 2008/0299555) entitled MULTICOLOR CHROMOGENIC DETECTION OF BIOMAKERS and U.S. patent application Ser. No. 11/809,024 (corresponding to U.S. Patent Publication No. 2011/0136130) entitled METHOD FOR CHROMOGENIC DETECTION OF TWO OR MORE TARGET MOLECULES IN A SINGLE SAMPLE disclose substances, protocols, and specimen processing techniques and are incorporated by reference in their entireties.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No. PCT/US2010/002772 (Patent Publication No. WO/2011/049608) entitled IMAGING SYSTEM AND TECHNIQUES or disclosed in U.S. Patent Application Publication No. 2014/0178169, filed on Sep. 9, 2011, entitled IMAGING SYSTEMS, CASSETTES, AND METHODS OF USING THE SAME. International Patent Application No. PCT/US2010/002772 and U.S. Patent Application Publication No. 2014/0178169 are incorporated by reference in their entities. In other embodiments, the imaging apparatus includes a digital camera coupled to a microscope.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

EXAMPLE 1

Let the $1^{st}$ principal component channel be pc1, after principal component analysis was performed on the input RGB image. The median value of the pc1 was denoted by pc1_median. The median absolute deviation (MAD) value computed from pc1 was denoted by pc1_MAD. In our framework, the pc1 channel was normalized and had values from [0-1]. The median value pc1_MAD=min(0.20, pc1_MAD). This global value of 0.20 was empirically determined so that there was a reasonable value assigned to MAD value of pc1. The threshold value assigned to pc1, called "pc1_threshold," returned a binary mask which was ON at pixels where pc1 value<pc1_threshold. The pc1 channel was intuitively similar to that channel which captured most of the image variation, and was visually similar to the grayscale image in most cases—when pc1 was lower than pc1_threshold, it denoted the foreground region (where nuclei are located) and hence, pixel values lower than a threshold value were regarded as the foreground region. The threshold pc1_threshold=(pc1_median−0.15*pc1_MAD).

EXAMPLE 2

For performing the LAT, we set 2 parameters—window size (w) and scale factor (s). The standard deviation sigma of a 2D Gaussian used for image smoothing was set to w/s. Using this sigma, the pc1 image I was smoothed and let the smoothed image be denoted by I' (the smoothed image I' was computed based on the parameters w and s). In pixels where I<I' (i.e. pixel values in the pc1 channel I were less than pixel values in the smoothed image I'), these pixels were more likely to be foreground. After steps (1) and (2), the pixels retained as foreground were those which obeyed global threshold constraints (pc1<pc1_threshold) and local threshold constraints (I<I', where I' is a function of w and s).

EXAMPLE 3

This example and FIG. 9 show the percentage of pathologist selected nuclei (corresponding to and referred to as "cells") that were "found" by the foreground segmentation algorithm. The columns 99/3, 109/4, 99/4, 89/4, and 79/4 refer to the window and scale used for LAT. STD refers to a prior art foreground algorithm for dual ISH. From the various parameters used for LAT, it was found that a much higher fraction of pathologist marked nuclei was retained after foreground segmentation if LAT was used as part of the foreground segmentation algorithm than if it were not included. This is compared with the prior art method which did not use LAT as a filter in foreground segmentation. Thus, the present disclosure provides a method that is far superior to that of the prior art.

"found" by algorithm means that there was rough agreement in area, and the centers of the pathologist's blob and the foreground blob were reasonably close:
if (acc>0.45*anucleus AND
acc<1.35*anucleus AND dist<11)
OR (acc>0.40*anucleus && dist<5.5)
where, anucleus=area of pathol nucleus (nucleus area threshold)
acc=area of foreground blob
dist=distance in pixels between centers of connected components.

Additional Embodiments

1. An image analysis method of segmenting and ranking nuclei in a digital image of a tissue specimen, the tissue specimen stained with at least a first and a second in situ hybridization stain having different colors, the method being implemented in an image analysis system and comprising: segmenting the digital image for generating a foreground segmentation mask, the foreground segmentation mask being selectively indicative of image regions representing nuclei; identifying individual nuclei in foreground regions identified by the foreground segmentation mask whose size exceeds a nucleus size threshold value; for each of the identified nuclei, performing an initial dot detection routine in a first channel image derived from the digital image for identifying first dots in said nucleus and in a second channel image derived from the digital image for identifying second dots in said nucleus, each first dot being a blob whose pixel values in the first channel image correlate with the amount of first stain, each second dot being a blob whose pixel intensities in the second channel image correlate with the amount of second stain; for each of the identified nuclei, counting the number of first dots and the number of second dots in said nucleus; ranking a plurality of the identified nuclei in descending order according to a ratio of the first and second dots in each nucleus.

2. The image analysis method of embodiment 1, further comprising: for each of a number of top-ranked nuclei, performing a refined dot detection routine for identifying refined versions of the first and second dots in said nucleus, wherein the initial dot detection routine is computationally less expensive than the refined dot detection routine.

3. The image analysis method of any one of the previous embodiments, each first dot is indicative of an individual copy of a particular gene, each second dot is indicative of an individual chromosome typically comprising said particular gene.

4. The image analysis method according to any one of the previous embodiments, the foreground segmentation of the digital image for generating the foreground segmentation mask comprising: representing color components of the digital image as a plurality of different color vectors, each of said vectors representing a different one of the color components; applying principal component analysis on said plurality of color vectors for obtaining a plurality of principal components; identifying a median (pc1_median) of the first principal component obtained in the principal component analysis; computing a global threshold, the global threshold being derived from the median; identifying pixels whose first principal component value is lower than the global threshold and using said identified pixels as foreground pixels in the foreground segmentation mask.

5. The image analysis method according to embodiment 4, the foreground segmentation of the digital image for generating the foreground segmentation mask further comprising: representing the first principal component obtained in the principal component analysis as a first principal component image (I), each pixel in the first principal component image pixel having assigned the value of said pixel specified in the first principal component for said pixel; generating a smoothed version (I') of the first principal component image by applying a 2D Gaussian filter on the first principal component image; performing a locally adaptive thresholding (LAT) on the foreground regions of the digital image in addition to the global thresholding, wherein performing the locally adaptive thresholding comprises identifying pixels whose pixel value in the first principal component image (I) is lower than the corresponding pixel value in the smoothed version (I') of the first principal component image, and selectively using the identified pixels as foreground pixels in the foreground segmentation mask.

6. The image analysis method of embodiment 5, wherein the identification of the pixels whose first principal component value is lower than the global threshold is executed before the locally adaptive thresholding is applied.

7. The image analysis method according to any one of the previous embodiments, further comprising: generating the first channel image as a derivative of the digital image, the first channel image being an absorbance image; identifying local absorbance maxima in the absorbance image whose absorbance values exceed an absorbance threshold and using the identified local absorbance maxima as prospective first dots; computing a first DoG image from the absorbance image by applying at least one pair of Gaussian filters whose Kernels have a different standard deviation on the absorbance image and by subtracting the two filtered images output by the Gaussian filters from each other, the first DoG image being a difference-of-Gaussian image; generating a first gradient image as a derivative of the first DoG image, each pixel of the first gradient image comprising a gradient being indicative of the amount and direction of a DoG value change in its neighborhood; identifying the ones of the prospective first dots whose pixel gradients in the first gradient image meet one or more radial symmetry criteria and using said identified prospective dots as the identified first dots.

8. The image analysis method according to any one of the previous embodiments, further comprising: generating the second channel image as a derivative of the digital image, the second channel image being the A or B channel image of a LAB color space representation of the digital image, wherein the one of the A and B LAB color space channels is used as the second channel image where the second in-situ-hybridization stain has a higher signal amplitude; identifying local maxima in the second channel image whose intensity values exceed a chrominance threshold and using the identified local maxima as prospective second dots; computing a second DoG image from the second channel image by applying at least one pair of Gaussian filters whose Kernels have a different standard deviation on the second channel image and by subtracting the two filtered images output by the Gaussian filters from each other, the second DoG image being a difference-of-Gaussian image; generating a second gradient image as a derivative of the second DoG image, each pixel of said second gradient image comprising a gradient being indicative of the amount and direction of a DoG value change in its neighborhood in the second DoG image; identifying the ones of the prospective second dots whose pixel gradients in whose gradients in the second gradient image meet one or more radial symmetry criteria and using said identified prospective second dots as the identified second dots.

9. The image analysis method according to any one of the previous embodiments, further comprising: identifying all nuclei comprising at least one first dot and at least one second dot; and identifying all nuclei whose size exceeds an empirically determined nucleus size threshold; and selectively ranking identified nuclei comprising at least one first and at least one second dot and whose size exceeds the nucleus size threshold.

10. The image analysis method of any one of the previous embodiments, further comprising: identifying the top N number of the ranked nuclei by:
segregating the identified total number of nuclei into three subsets, where a first subset comprises nuclei ranked as having the highest average pixel values in the first channel image, a second subset comprises nuclei ranked as having the highest average pixel values in the second channel image, and a third subset comprises nuclei common to both the first and second subsets; and
evaluating whether the number of nuclei in the third subset is identical to or exceeds the number N;
if yes, ranking the nuclei in the third subset according to the ratio of first to second dots and using the top N nuclei of the third subset as the identified top N number of ranked nuclei;
if no, re-ranking all nuclei according to a derivative value computed for each nucleus as a function of the average pixel values of said nucleus in the first channel image and of the average pixel values of said nucleus in the second channel image and using the top N nuclei of the re-ranked nuclei as the identified top N number of ranked nuclei;
outputting the identified top N number of the ranked nuclei.

11. The image analysis method of any one of the previous embodiments, further comprising: outputting the ranked nuclei or a top N number of the ranked nuclei via a graphical user interface, the outputting comprising one or more of:
generating a heatmap in which the ranks or rank intervals of the output ranked nuclei are represented as colors, the heatmap being presented as a complete or partial overlay of the digital image;
highlighting at least a top N number of the ranked nuclei, the color or brightness of the highlighting correlating with the rank of the nuclei.

12. An image analysis system (14) configured for segmenting and ranking nuclei in a digital image of a tissue specimen, the tissue specimen stained with at least a first and a second in situ hybridization stain having different colors, the image analysis system comprising a processor configured for: segmenting the digital image for generating a foreground segmentation mask, the foreground segmentation mask being selectively indicative of image regions representing nuclei; identifying individual nuclei in foreground regions identified by the foreground segmentation mask whose size exceeds a nucleus size threshold value; for each of the identified nuclei, performing an initial dot detection routine in a first channel image derived from the digital image for identifying first dots in said nucleus and in a second channel image derived from the digital image for identifying second dots in said nucleus, each first dot being a blob whose pixel values in the first channel image correlate with the amount of first stain, each second dot being a blob whose pixel intensities in the second channel image correlate with the amount of second stain; for each of the identified nuclei, counting the number of first dots and the number of second dots in said nucleus; ranking a plurality of the identified nuclei in descending order according to a ratio of the first and second dots in each nucleus.

13. A computer-implemented method of segmenting and ranking nuclei in source images of a tissue specimen, the tissue specimen stained in an in situ hybridization assay comprising (1) computing a foreground segmentation mask based on an image input; (2) identifying individual nuclei by filtering the input image with the computed foreground segmentation mask; (3) computing metrics for all identified nuclei based on black in situ hybridization signals corresponding to HER2 and red in situ hybridization signals corresponding to Chromosome 17, present in the nuclei; (4) evaluating the metrics to determine nuclei suitable for ranking, wherein nuclei suitable for ranking have at least one black dot corresponding to black in situ hybridization signals, at least one red dot corresponding to red in situ hybridization signals, and satisfy a predetermined area constraint; and (5) identifying a top N number of nuclei for scoring from the determined nuclei suitable for ranking.

14. The computer-implemented method of embodiment 13, wherein the foreground segmentation mask is computed by (1) applying filters to enhance the image such that (a) image regions unlikely to have nuclei are discarded, and (b) nuclei within a local region are identified; and (2) further applying optional filters to selectively remove artifacts, remove small blobs, remove small discontinuities, fill holes, and split up bigger blobs.

15. The computer-implemented method of embodiment 14, wherein the filters applied are selected from the group consisting of a global thresholding filter, a locally adaptive thresholding filter, morphological operations, and watershed transformations.

16. The computer-implemented method of embodiment 15, wherein the global thresholding filter is applied first, followed by application of the locally adaptive thresholding filter.

17. The computer-implemented method of embodiment 16, wherein the optional filters to selectively remove artifacts, remove small blobs, remove small discontinuities, fill holes, and split up bigger blobs are applied after application of the locally adaptive thresholding filter.

18. The computer-implemented method of embodiment 13, wherein the identification of the individual nuclei further comprises performing a connected components labeling process on the filtered input image.

19. The computer-implemented method of embodiment 13, wherein the metrics based on the black and red in situ hybridization signals present in the identified nuclei are selected from the group consisting of an average absorbance metric and an average A channel metric.

20. The computer-implemented method of embodiment 19, wherein the average absorbance metric is computed within the RGB domain at all local maxima using radial symmetry voting on gradient magnitude of difference of Gaussian applied on the absorbance channel.

21. The computer-implemented method of embodiment 19, wherein the average A channel metric is computed within the LAB color space at all local maxima using radial symmetry voting on gradient magnitude of difference of Gaussian applied on the A channel.

22. The computer-implemented method of embodiment 13, wherein the top N number of nuclei for scoring are identified by (1) identifying a total number of nuclei that meet the established criteria; (2) segregating the identified total number of nuclei into three subsets, where a first subset comprises nuclei ranked as having the highest average absorbance, a second subset comprises nuclei ranked as having the highest average A, and a third subset comprises nuclei common to both the first and second subsets; and (3) evaluating whether a number of nuclei in the third subset meets a predefined threshold amount.

23. The computer-implemented method of embodiment 22, wherein the number of nuclei within the third subset are ranked based on a black-to-red ratio.

24. The computer-implemented method of embodiment 13, further comprising the step of scoring the identified nuclei.

25. A computing device configured to segment and rank nuclei in source images comprising one or more processors and at least one memory, the at least one memory storing non-transitory computer-readable instructions for execution by the one or more processors to cause the one or more processors to execute instructions to: (1) compute a foreground segmentation mask based on an image input; (2) identify individual nuclei by filtering the input image with the computed foreground segmentation mask; (3) compute metrics for all identified nuclei based on black in situ hybridization signals in the nuclei corresponding to HER2 and red in situ hybridization signals in the nuclei corresponding to Chromosome 17 (4) determine nuclei suitable for ranking based on the computed metrics, wherein the nuclei suitable for ranking have at least one black dot corresponding to black in situ hybridization signals, at least one red dot corresponding to red in situ hybridization signals, and satisfy a predetermined area constraint; and (5) identify a top N number of nuclei for scoring.

26. The computing device of embodiment 25, wherein the foreground segmentation mask is computed by (1) applying filters to enhance the image such that (a) image regions unlikely to have nuclei are discarded, and (b) nuclei within a local region are identified; and (2) further applying optional filters to selectively remove artifacts, remove small blobs, remove small discontinuities, fill holes, and split up bigger blobs.

27. The computing device of embodiment 26, wherein the filters applied are selected from the group consisting of a global thresholding filter, a locally adaptive thresholding filter, morphological operations, and watershed transformations.

28. The computing device of embodiment 27, wherein the global thresholding filter is applied first, followed by application of the locally adaptive thresholding filter.

29. The computing device of embodiment 28, wherein the optional filters to selectively remove artifacts, remove small blobs, remove small discontinuities, fill holes, and split up bigger blobs are applied after application of the locally adaptive thresholding filter.

30. The computing device of embodiment 25, wherein the identification of individual nuclei comprises performing a connected components labeling process on the filtered input image.

31. The computing device of embodiment 25, wherein the metrics based on black and red in situ hybridization signals present in the identified nuclei are selected from the group consisting of an average absorbance metric and an average A channel metric.

32. The computing device of embodiment 31, wherein the average absorbance metric is computed within the RGB domain at all local maxima using radial symmetry voting on gradient magnitude of difference of Gaussian applied on the absorbance channel.

33. The computing device of embodiment 31, wherein the average A channel metric is computed within the LAB color space at all local maxima using radial symmetry voting on gradient magnitude of difference of Gaussian applied on the A channel.

34. The computing device of embodiment 25, wherein the top N number of nuclei for scoring are identified by (1) identifying a total number of nuclei that meet the established criteria; (2) segregating the identified total number of nuclei into three subsets, where a first subset comprises nuclei ranked as having the highest average absorbance, a second subset comprises nuclei ranked as having the highest average A, and a third subset comprises nuclei common to both the first and second subsets; and (3) evaluating whether a number of nuclei in the third subset meets a predefined threshold amount.

35. The computing device of embodiment 34, wherein the number of nuclei within the third subset are ranked based on a black to red ratio.

36. The computer-implemented method of embodiment 25, wherein instructions are further provided to score the identified nuclei.

37. A cell analyzer comprising the computer device of embodiment 25 and an imaging apparatus.

38. A method for automated segmenting and ranking of nuclei in a tissue specimen, comprising: (a) applying a first in situ hybridization probe and a second in situ hybridization probe to the tissue specimen; (b) subsequently obtaining a digital image of the tissue specimen; (c) selecting a field of view in the digital image; (d) within the field of view, computing a foreground segmentation mask to identify individual nuclei; (e) computing metrics for all nuclei based on average absorbance and average A channel derived from signals from the first and second in situ hybridization probes; (f) evaluating the metrics to determine nuclei suitable for ranking; and (g) providing as output a top N number of nuclei for scoring.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A computing device configured to segment and/or rank nuclei in one or more images of a biological sample, the computing device comprising one or more processors and at least one memory, the at least one memory storing non-transitory computer-readable instructions for execution by the one or more processors to cause the one or more processors to execute instructions to: (1) compute a mask based on a first image input; (2) identify individual nuclei by filtering the first image with the computed mask; (3) compute metrics for all identified nuclei based on first signals in the nuclei corresponding to a first marker and second signals in the nuclei corresponding to a second marker, wherein the metrics comprise an average absorbance metric and an average A channel metric; and (4) determine nuclei suitable for ranking based on the computed metrics, wherein nuclei determined suitable for ranking have at least one first signal, at least one second signal, and meet a predetermined area constraint.

2. The computing device of claim 1, wherein the first and second signals are derived from different first and second chromogens.

3. The computing device of claim 1, further comprising identifying a top number of nuclei for scoring from the nuclei determined suitable for ranking.

4. The computing device of claim 1, wherein the mask is computed by (1) applying one or more first filters to enhance the first image; and (2) optionally applying one or more second filters to selectively remove artifacts, remove small blobs, remove small discontinuities, fill holes, and/or split up bigger blobs.

5. The computing device of claim 1, wherein the identification of individual nuclei comprises performing a connected components labeling process on the filtered first image.

6. The computing device of claim 1, wherein the average absorbance metric is computed within a RGB domain at all local maxima using radial symmetry voting on gradient magnitude of difference of Gaussian applied on an absorbance channel.

7. The computing device of claim 1, wherein the average A channel metric is computed within a LAB color space at all local maxima using radial symmetry voting on gradient magnitude of difference of Gaussian applied on an A channel.

8. The computing device of claim 1, further comprising instructions to rank the nucleic determined suitable for ranking.

9. The computing device of claim 8, further comprising instructions to score the ranked nuclei.

10. A computer-implemented method of segmenting and/or ranking nuclei in source images of a tissue specimen, the tissue specimen stained for the presence of one or more markers, the method comprising (1) computing a mask based on an image input; (2) identifying individual nuclei by filtering the input image with the computed mask; (3) computing metrics for all identified nuclei based on first signals corresponding to a first marker and second signals corresponding to a second marker, wherein the metrics comprise an average absorbance metric and an average A channel metric; and (4) evaluating the metrics to determine nuclei suitable for ranking, wherein the first and second signals are derived from different first and second chromogens.

11. The computer-implemented method of claim 10, further comprising identifying a top number of nuclei for scoring from the nuclei determined suitable for ranking.

12. The computer-implemented method of claim 10, wherein the mask is computed by (1) applying one or more first filters to enhance the input image; and (2) optionally applying one or more second filters to selectively remove artifacts, remove small blobs, remove small discontinuities, fill holes, and/or split up bigger blobs.

13. The computer-implemented method of claim 10, wherein the identification of individual nuclei comprises performing a connected components labeling process on the filtered input image.

14. The computer-implemented method of claim 10, wherein the average absorbance metric is computed within a RGB domain at all local maxima using radial symmetry voting on gradient magnitude of difference of Gaussian applied on an absorbance channel.

15. The computer-implemented method of claim 10, wherein the average A channel metric is computed within a LAB color space at all local maxima using radial symmetry voting on gradient magnitude of difference of Gaussian applied on an A channel.

16. The computer-implemented method of claim 10, further comprising ranking nucleic determined suitable for ranking.

17. The computer-implemented method of claim 10, further comprising scoring the ranked nuclei.

18. The computer-implemented method of claim 10, wherein nuclei determined suitable for ranking have at least one first signal, at least one second signal, and meet a predetermined area constraint.

* * * * *